(12) United States Patent
Kajino et al.

(10) Patent No.: US 11,190,125 B2
(45) Date of Patent: Nov. 30, 2021

(54) CONTROL SYSTEM, VEHICLE SYSTEM, AND CONTROL METHOD

(71) Applicant: HONDA MOTOR CO., LTD., Tokyo (JP)

(72) Inventors: Daiki Kajino, Wako (JP); Hidetoshi Matsuura, Wako (JP); Tomoyuki Sano, Wako (JP); Takahiro Endou, Wako (JP); Tatsunori Obe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 16/787,072

(22) Filed: Feb. 11, 2020

(65) Prior Publication Data

US 2020/0266749 A1 Aug. 20, 2020

(30) Foreign Application Priority Data

Feb. 18, 2019 (JP) .............................. JP2019-026744

(51) Int. Cl.
*H02P 27/08* (2006.01)
*B60L 50/51* (2019.01)
*B60K 6/26* (2007.10)

(52) U.S. Cl.
CPC .............. *H02P 27/08* (2013.01); *B60L 50/51* (2019.02); *B60K 6/26* (2013.01); *B60L 2210/40* (2013.01); *B60Y 2200/91* (2013.01); *B60Y 2200/92* (2013.01); *B60Y 2400/604* (2013.01); *B60Y 2400/61* (2013.01)

(58) Field of Classification Search
CPC ........ H02P 27/08; H02P 27/085; H02P 29/50; B60L 15/08; B60L 2210/40; B60L 50/51; B60K 6/26; B60Y 2200/91; B60Y 2200/92; B60Y 2400/604; B60Y 2400/61

See application file for complete search history.

(56) References Cited

U.S. PATENT DOCUMENTS

| 7,969,106 B2 * | 6/2011 | Kitanaka ................. H02P 27/04 318/400.02 |
| 9,083,276 B2 * | 7/2015 | Yamada .................. H02K 19/12 |
| 9,660,560 B2 * | 5/2017 | Kemp .................. H02P 21/0085 |

(Continued)

FOREIGN PATENT DOCUMENTS

| JP | 10-234199 | 9/1998 |
| JP | 2005-102455 | 4/2005 |

(Continued)

OTHER PUBLICATIONS

Japanese Notice of Allowance for Japanese Patent Application No. 2019-026744 dated Dec. 8, 2020.

*Primary Examiner* — Thai T Dinh
(74) *Attorney, Agent, or Firm* — Amin, Turocy & Watson, LLP

(57) ABSTRACT

A control system includes a power inverter configured to convert direct current (DC) power into alternating current (AC) power, an electric motor configured to be driven using the AC power output by the power inverter, and a controller configured to control the AC power by performing switching between multi-pulse control and one-pulse control on the basis of electric power loss of the electric motor and the power inverter and noise of the electric motor, the controller being a control device configured to control the power inverter.

16 Claims, 13 Drawing Sheets

(56) References Cited

U.S. PATENT DOCUMENTS

| | | | | |
|---|---|---|---|---|
| 9,847,744 B2* | 12/2017 | Fujii | ............ | H02P 27/06 |
| 2007/0229010 A1* | 10/2007 | Tsuji | ............ | H02P 21/06 |
| | | | | 318/432 |
| 2009/0295316 A1* | 12/2009 | Patel | ............ | B60L 15/2009 |
| | | | | 318/400.02 |
| 2016/0380576 A1* | 12/2016 | Sugahara | ............ | H02P 27/06 |
| | | | | 318/798 |
| 2017/0313206 A1* | 11/2017 | Yamamoto | ............ | B60L 50/61 |
| 2017/0331410 A1* | 11/2017 | Kondo | ............ | H02P 21/26 |

FOREIGN PATENT DOCUMENTS

| | | | |
|---|---|---|---|
| JP | 2007-181400 | | 7/2007 |
| JP | 2009-100548 | | 5/2009 |
| JP | 2009100548 A | * | 5/2009 |
| JP | 2010-207030 | | 9/2010 |
| JP | 2011-239680 | | 11/2011 |
| JP | 2013-215041 | | 10/2013 |
| JP | 2016-136838 | | 7/2016 |
| WO | 2013/046460 | | 4/2013 |

* cited by examiner

92

| VOLTAGE / ROTATION SPEED | ... | Vx20 | Vx21 | Vx22 | Vx23 | ... |
|---|---|---|---|---|---|---|
| ⋮ | ⋮ | ⋮ | ⋮ | ⋮ | ⋮ | ... |
| rpm1 | ... | 1PLS | 1PLS | 1PLS | 1PLS | ... |
| rpm2 | ... | 1PLS | 1PLS | 1PLS | 1PLS | ... |
| rpm3 | ... | 1PLS | 1PLS | 1PLS | 1PLS | ... |
| rpm4 | ... | PWM | PWM | PWM | PWM | ... |
| ⋮ | ⋮ | ⋮ | ⋮ | ⋮ | ⋮ | ⋮ |

1PLS: ONE-PULSE CONTROL
PWM: PWM CONTROL

94

| TORQUE COMMAND VALUE \ VOLTAGE | ... | Vx20 | Vx21 | Vx22 | Vx23 | ... |
|---|---|---|---|---|---|---|
| ⋮ | ⋮ | ⋮ | ⋮ | ⋮ | ⋮ | ... |
| Tr20 | ... | 1PLS | 1PLS | 1PLS | 1PLS | ... |
| Tr21 | ... | 1PLS | 1PLS | 1PLS | 1PLS | ... |
| Tr22 | ... | 1PLS | 1PLS | 1PLS | 1PLS | ... |
| Tr23 | ... | PWM | PWM | PWM | PWM | ... |
| ⋮ | ⋮ | ⋮ | ⋮ | ⋮ | ⋮ | ⋮ |

1PLS: ONE-PULSE CONTROL
PWM: PWM CONTROL

CONTROL SYSTEM, VEHICLE SYSTEM, AND CONTROL METHOD

CROSS-REFERENCE TO RELATED APPLICATION

Priority is claimed on Japanese Patent Application No. 2019-026744, filed Feb. 18, 2019, the content of which is incorporated herein by reference.

BACKGROUND

Field

The present invention relates to a control system, a vehicle system, and a control method.

Description of Related Art

Conventionally, an electric vehicle control device including an inverter configured to convert direct current (DC) power into alternating current (AC) power and control driving of an electric motor that drives the electric vehicle with the AC power has been disclosed (Japanese Unexamined Patent Application, First Publication No. 2009-100548). The electric vehicle control device has a means for selecting a multi-pulse pulse width modulation (PWM) control mode or a synchronous single pulse control mode as a switching control mode of the inverter and switching the mode from the synchronous single pulse control mode to the multi-pulse control mode when an inverter frequency in the synchronous single pulse control mode is within a specific frequency band.

However, the above-described device cannot sufficiently minimize noise or vibration of the motor and improve fuel efficiency.

SUMMARY

The present invention has been made in consideration of such circumstances and an objective of the present invention is to provide a control system, a vehicle system, and a control method capable of improving fuel efficiency while minimizing noise or vibration of a motor.

A control system, a vehicle system, and a control method according to the present invention adopt the following configurations.

(1): According to an aspect of the present invention, a control system is provided, including: a power inverter configured to convert DC power into AC power; an electric motor configured to be driven using the AC power output by the power inverter; and a controller configured to control the power inverter, the controller being configured to control the AC power by performing switching between multi-pulse control and one-pulse control on the basis of electric power loss of the electric motor and the power inverter and noise of the electric motor.

(2): In the above-described aspect (1), the controller derives the electric power loss on the basis of a rotation speed of the electric motor and a voltage input to the power inverter.

(3): In the above-described aspect (2), the controller refers to first corresponding information in which first information indicating that the electric power loss satisfies a criterion or second information indicating that the electric power loss does not satisfy the criterion is associated with the rotation speed of the electric motor and the voltage input to the power inverter, and the controller selects the one-pulse control when information derived on the basis of the rotation speed of the electric motor and the voltage input to the power inverter is the first information.

(4): In the above-described aspect (2), the controller further derives the electric power loss on the basis of a torque command value of the electric motor.

(5): In the above-described aspect (4), the controller refers to second corresponding information in which first information indicating that the electric power loss satisfies a criterion or second information indicating that the electric power loss does not satisfy the criterion is associated with the rotation speed of the electric motor, the voltage input to the power inverter, and the torque command value of the electric motor, and the controller selects the one-pulse control when information derived on the basis of the rotation speed of the electric motor, the voltage input to the power inverter, and the torque command value of the electric motor is the first information.

(6): In any one of the above-described aspects (1) to (5), the controller refers to third corresponding information in which third information indicating that noise satisfies a criterion or fourth information indicating that the noise does not satisfy the criterion is associated with a torque command value of the electric motor and a voltage input to the power inverter, and the controller selects the one-pulse control when information derived on the basis of the torque command value of the electric motor and the voltage input to the power inverter is the third information.

(7): In the above-described aspect (6), the third corresponding information is information generated on the basis of information indicating a change in the noise with respect to the rotation speed of the electric motor for each combination of the torque command value of the electric motor and the voltage input to the power inverter.

(8): In any one of the above-described aspects (1) to (7), the controller acquires an electric current index indicating a magnitude of an electric current output from the power inverter to the electric motor when the multi-pulse control is being executed and switches the control to the one-pulse control when the acquired electric current index is less than or equal to a threshold value.

(9): In the above-described aspect (8), the threshold value is an index that is set so that a specific electric current in consideration of an electric current increased by the switching is not greater than or equal to a specific threshold value greater than the threshold value when the control has been switched from the multi-pulse control to the one-pulse control.

(10): In the above-described aspect (8) or (9), the controller does not switch the control to the one-pulse control when the electric current index exceeds the threshold value and switches the control to the one-pulse control when a change from a state in which the electric current index exceeds the threshold value to a state in which the electric current index is less than or equal to the threshold value is made.

(11): According to an aspect of the present invention, a control system is provided, including: a power inverter configured to convert DC power into AC power; an electric motor configured to be driven using the AC power output by the power inverter; a first acquirer configured to acquire a voltage input to the power inverter; a second acquirer configured to acquire a rotation speed of the electric motor; and a controller configured to determine whether or not control is switched to multi-pulse control on the basis of the voltage acquired by the first acquirer and the rotation speed of the electric motor acquired by the second acquirer when one-pulse control is being executed, determine whether or not the control is switched to the one-pulse control on the basis of the voltage acquired by the first acquirer, the rotation speed of the electric motor acquired by the second acquirer, and an electric current applied to the electric motor in the multi-pulse control when the multi-pulse control is being executed, and control the power inverter on the basis of a result of the determination.

(12): A vehicle system is provided, including: the control system according to any one of the above-described aspects (1) to (11); and driving wheels configured to be driven by power of the electric motor.

(13): According to an aspect of the present invention, a control method is provided, including: controlling, by a control device, AC power to be output to an electric motor to be driven using AC power output by a power inverter by controlling the power inverter configured to convert DC power into the AC power; and controlling, by the control device, the AC power by performing switching between multi-pulse control and one-pulse control on the basis of electric power loss of the electric motor and the power inverter and noise of the electric motor.

According to (1), (9), and (11) to (13), the control system can improve fuel efficiency while minimizing noise or vibration of the motor by performing switching between multi-pulse control and one-pulse control on the basis of electric power loss of the electric motor and the inverter and the noise of the electric motor. That is, it is possible to achieve both improvement of fuel efficiency (electricity efficiency) and improvement of merchantability.

According to (2) and (3), the control system can accurately derive a degree of electric power loss. As a result, fuel efficiency is further improved.

According to (4) and (5), the control system can more accurately derive a degree of electric power loss in consideration of a torque instruction. As a result, fuel efficiency is further improved.

According to (6) and (7), the control system can accurately derive a degree of noise. As a result, the merchantability is further improved.

According to (8) and (9), the control system switches the control to the one-pulse control when the acquired index indicating the magnitude of the electric current is less than or equal to the threshold value, so that the application of the electric current that increases due to the switching to the electric motor is minimized. As a result, the durability of the electric motor can be improved.

According to (10), it is possible to minimize the application of an increasing electric current to the electric motor.

DETAILED DESCRIPTION

Hereinafter, a control system, a vehicle system, and a control method according to embodiments of the present invention will be described with reference to the drawings.

First Embodiment

A control device according to the present embodiment is mounted on, for example, a hybrid electric vehicle (HEV) or an electric vehicle. The HEV includes an electric motor (a motor) and an internal combustion engine (an engine), and travels with motive power of one or both of the electric motor and the engine according to a traveling state of the vehicle. Hereinafter, a traveling mode using only the motive power output by the motor may be referred to as "motor traveling", a traveling mode using only the motive power output by the engine may be referred to as "engine traveling", and a traveling mode using both the motive power output by the motor and the motive power output by the engine may be referred to as "engine/motor traveling".

An HEV driving scheme includes a parallel scheme, a series scheme (including a range extender scheme), a series/parallel scheme, and the like. The control device of the present embodiment can be mounted on vehicles of various driving schemes using an electric motor as a motive power source in addition to the applicable driving schemes described above. In the following description, an example in which a vehicle 1 is mounted on a plug-in hybrid electrical vehicle (PHEV) shown in FIG. 1 will be described.

Figure 1:
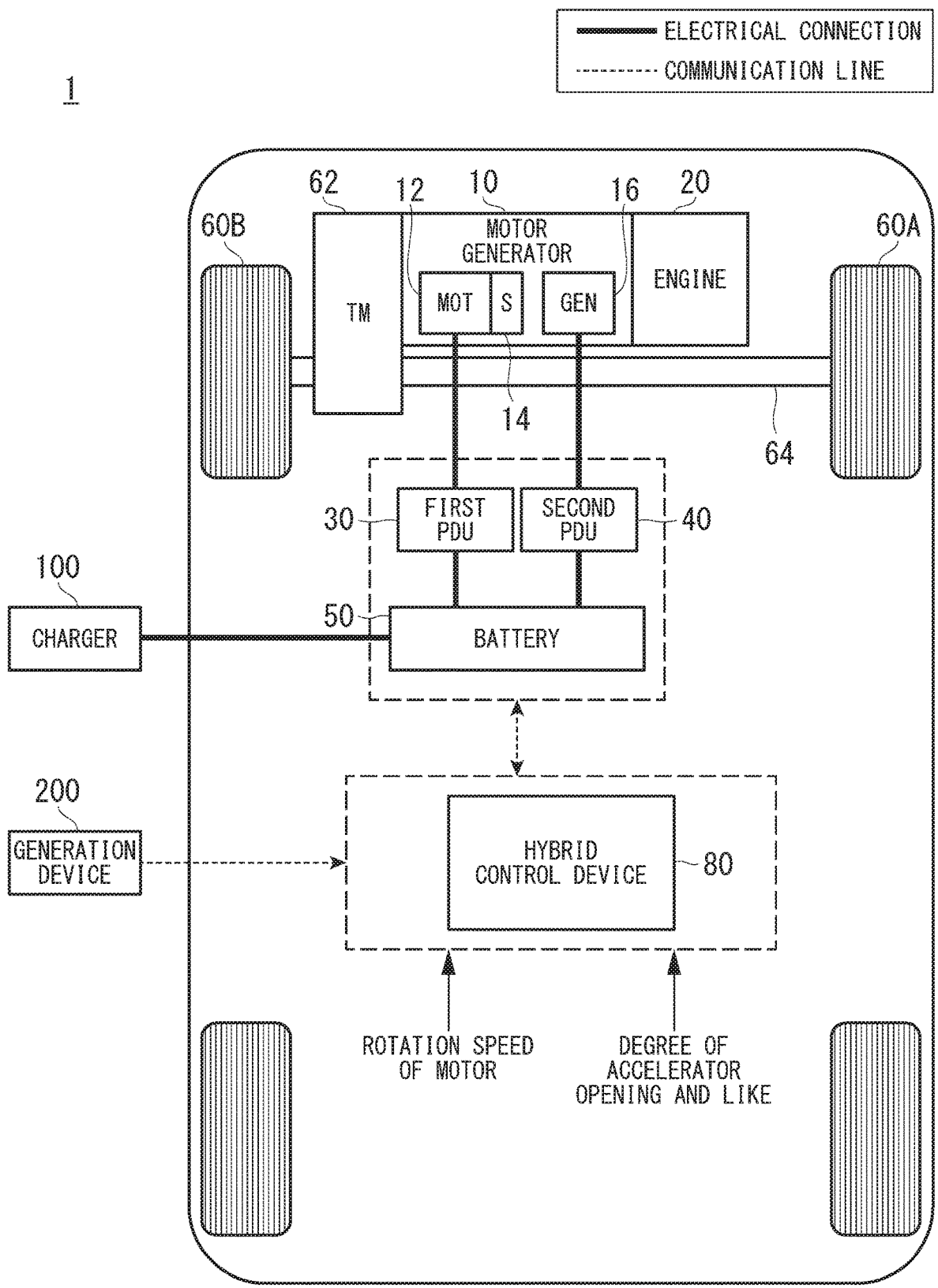
FIG. 1 is a configuration diagram of a vehicle.

FIG. 1 is a configuration diagram of the vehicle 1. The vehicle 1 includes, for example, a motor generator 10, an engine 20, a first power drive unit (PDU) 30, a second PDU 40, a battery 50, driving wheels 60 (60A and 60B), a transmission (TM) 62, an axle 64, and a hybrid control device (control device) 80.

The motor generator 10 can be connected to the driving wheels 60. The motor generator 10 includes, for example, a motor (traction motor) 12, a rotation angle sensor 14, a generator 16, and the like.

The motor 12 generates motive power (a driving force) for enabling the vehicle to travel. The motor 12 is operable using, for example, electric power output by the battery 50 (AC power output from the first PDU 30) or electric power output from the generator 16. The motive power of the motor 12 is transferred to the axle 64 via the transmission 62. The motor 12 functions as a regenerative power generator during deceleration braking of the vehicle 1 and outputs generated electric power to the battery 50 via the first PDU 30.

For example, the rotation angle sensor 14 is a sensor that detects a rotation angle of the motor 12 and a rotation speed of the motor 12 such as a resolver.

The generator 16 outputs the electric power generated by the rotation to the battery 50 via the second PDU 40 using the rotation of the engine 20 as a motive power source. The generator 16 may be omitted. In this case, the above-described motor 12 performs power generation and the like instead of the generator 16. The generator 16 may be provided with a resolver that detects the rotation speed of the generator 16.

The engine 20 causes motive power for enabling the vehicle 1 to travel to be generated. When an overdrive clutch (not shown) is connected, the motive power of the engine 20 is output to the axle 64 via the transmission 62. That is, the driving wheels 60 can be connected to or disconnected from the engine 20 and driven by the motive power output by the engine 20 in the connected state. When the overdrive clutch is not connected, the motive power of engine 20 is output to a rotating shaft of the generator 16.

The first PDU 30 is electrically connected between the motor 12 and the battery 50. The first PDU 30 includes an inverter 32 and a booster (DC-DC converter) 34, which will be described below with reference to FIG. 2, and the like. The first PDU 30, the inverter 32 or the inverter 32 and the booster 34 are an example of a "power inverter".

The inverter converts the DC power output by the battery 50 into AC power to output the AC power after the conversion to the motor 12 or converts the AC power output by the motor 12 into DC power to output the DC power after the conversion to the battery 50. The booster 34 converts a voltage of the electric power supplied by the battery 50 into a predetermined voltage.

The second PDU 40 is electrically connected between the generator 16 and the battery 50. The second PDU 40 includes an inverter, a DC-DC converter, and the like. The inverter converts the DC power output by the battery 50 into AC power to output the AC power after the conversion to the generator 16 or converts the AC power output by the generator 16 into DC power to output the DC power after the conversion to the battery 50. The DC-DC converter converts a voltage of electric power supplied by the battery 50 into a predetermined voltage.

The battery 50 stores electric power output by the first PDU 30 or the second PDU. The battery 50 supplies the electric power to the motor generator 10 and other in-vehicle devices via the first PDU 30 or the second PDU 40. The battery 50 stores electric power output by the charger 100 when the battery 50 is electrically connected to the charger 100. The battery 50 can be charged using electric power supplied by the charger 100, which is an external power-feeding device.

The hybrid control device 80 includes, for example, a controller 82 and a storage 90. The hybrid control device 80 (the controller 82) is, for example, an electronic control unit (ECU) that controls the motor generator 10, the engine 20, the first PDU 30, the second PDU 40, and the battery 50. For example, the hybrid control device 80 executes control by a hardware processor such as a central processing unit (CPU) executing a program (software). Some or all of these components (the controller 82) included in the hybrid control device 80 are implemented, for example, by hardware (a circuit including circuitry) such as large-scale integration (LSI), an application-specific integrated circuit (ASIC), a field-programmable gate array (FPGA), or a graphics-processing unit (GPU) or may be implemented by cooperation between software and hardware. The program may be pre-stored in a storage device such as a hard disk drive (HDD) or a flash memory of the hybrid control device 80 (a storage device including a non-transitory storage medium) or may be installed in the HDD or the flash memory of the hybrid control device 80 when the program is stored in a removable storage medium (a non-transitory storage medium) such as a DVD or a CD-ROM and the storage medium (the non-transitory storage medium) is mounted in a drive device.

The hybrid control device 80 is not limited to one ECU and may be a set of a plurality of ECUs that have been distributed. The hybrid control device 80 acquires a vehicle speed of the vehicle 1 acquired from a vehicle speed sensor (not shown), a rotation speed of the engine 20 acquired from a crank angle sensor, a rotation speed of the motor 12 detected by the rotation angle sensor 14, a rotation speed of the generator 16 detected by the rotation angle sensor such as a resolver, a degree of opening of an accelerator pedal (a degree of accelerator opening AC) operated by an occupant (a driver) of the vehicle 1, or the like. The degree of accelerator opening is acquired by an accelerator opening degree sensor (not shown).

For example, the hybrid control device 80 derives requested torque Tr to be output to the axle 64 and requested by the driver on the basis of the degree of accelerator opening AC and a speed V of the vehicle 1. The hybrid control device 80 derives motive power P to be output to the axle 64 on the basis of the requested torque Tr and the rotation speed of the axle 64.

The hybrid control device 80 determines the motive power to be output by the motor 12 or the engine 20. The hybrid control device 80 determines motive power Pe and motive power Pm so that a sum of motive power P and motive power P any matches one of the motive power Pe output by the engine 20 and the motive power Pm output by the motor 12 or a sum thereof. The motive power P any includes motive power output by an auxiliary device mounted on the vehicle 1, motive power for covering a required amount of charge of the battery 50, and the like. When the vehicle 1 has a driving scheme different from that of the PHEV of the present embodiment, the motive power to be output from the motor 12 and the engine 20 is determined in accordance with the driving scheme thereof.

An example of a method of determining the motive power Pe and the motive power Pm will be described. The hybrid control device 80 causes one or both of the motor 12 and the engine 20 to be driven on the basis of a traveling mode at that time. The hybrid control device 80 switches the traveling mode in accordance with a traveling situation (a case of starting, low-speed traveling, medium-speed traveling, high-speed traveling, or rapid acceleration). For example, the vehicle 1 performs motor traveling by causing the motor 12 to be driven in a situation in which relatively large torque is required at the time of starting, in low-speed traveling, or the like. The vehicle 1 performs engine traveling or engine/motor traveling by causing one or both of the motor 12 and the engine 20 to be driven at the time of medium-speed traveling or high-speed traveling.

The controller 82 transmits a control signal for controlling the battery 50, the inverter 32, the booster 34, and the like via a communication line connected thereto. Thereby, the controller 82 controls the battery 50, the inverter 32, the booster 34, and the like.

The controller 82 controls the AC power to be output to the motor 12 by controlling the inverter 32. The controller 82 controls the AC power by performing switching between PWM control (an example of "multi-pulse control") and one-pulse control on the basis of electric power loss of the motor 12 and the inverter 32 and noise (or vibration) of the motor 12. The electric power loss is electric power loss (switching loss) caused by switching of the switching element of the inverter 32 and electric power loss in the motor 12. Although the electric power loss will be described as total loss including the switching loss and the electric power loss in the motor 12 in the following description, the electric power loss may be the switching loss.

The multi-pulse control includes control of various schemes such as a three-phase modulation scheme, a two-phase modulation scheme, and an overmodulation scheme. The one-pulse control is control for driving the inverter 32 using rectangular waves. The one-pulse control is a mode in which the inverter 32 is controlled so that a voltage is applied to the motor 12 during a predetermined period in which an electric current is applied in one cycle of an electrical angle (for example, 180 degrees). The one-pulse control is a control mode in which the inverter 32 is controlled so that a rectangular wave voltage is applied to the motor 12.

When the one-pulse control is being executed, the controller 82 determines whether or not the control is switched to the PWM control on the basis of a voltage acquired by the second voltage sensor 38 and a rotation speed of the motor 12 acquired by the rotation angle sensor 14. When the PWM pulse control is being executed, the controller 82 determines whether or not the control is switched to the one-pulse control on the basis of the voltage acquired by the second voltage sensor 38, the rotation speed of the motor 12 acquired by the rotation angle sensor 14, and the electric current applied to the motor 12 in the PWM control. The controller 82 controls the first PDU 30 on the basis of a result of the above-described determination. Details of these processes will be described below.

The storage 90 is implemented by an HDD, a flash memory, an electrically-erasable programmable read-only memory (EEPROM), a read-only memory (ROM), a random-access memory (RAM), or the like. The storage 90 stores, for example, loss determination information 92, motor NV determination information 94, switching condition information 96, and the like. The above-described information is a table and a two-dimensional or three-dimensional map to be referred to by the hybrid control device 80 in the process, a function, a learning model generated in a learning process such as deep learning, and the like. The loss determination information 92 is an example of "first corresponding information". The motor NV determination information 94 is an example of "second corresponding information".

[Traveling Mode]

The vehicle 1 travels in, for example, first to third traveling modes. The vehicle 1 travels by performing switching between the following traveling modes in accordance with a situation.

The first traveling mode is a traveling mode in which the motor 12 operates with the electric power output from the battery 50 to drive the driving wheels 60. The first traveling mode is a mode that is set in a case in which relatively large torque is required to be output, for example, such as a case in which the vehicle 1 starts or is in a city or climbs uphill at a low speed.

The second traveling mode is a traveling mode in which the engine 20 and the generator 16 operate to generate electric power. The generated electric power is output to the motor 12 (or the motor 12 and the battery 50). The motor 12 is operated by electric power output by the generator 16 (or the power output by the generator 16 and the battery 50) to drive the driving wheels 60. The second traveling mode is a mode that is set in a case in which relatively large torque is required to be output, for example, such as a case in which the vehicle 1 climbs uphill with an acceleration of a predetermined degree or more or at a medium speed.

The third traveling mode is a traveling mode in which the motive power of the engine 20 is transferred to the driving wheels 60 or the motor 12 when an overdrive clutch (not shown) is connected and the engine 20 is operated. The driving wheels 60 are driven by the motive power of the engine 20. The motor 12 outputs the electric power generated by the motive power of the engine 20 to the battery 50. Thereby, the battery 50 is charged. In some cases, the motive power of the motor 12 operated by the electric power of the battery 50 is output to the driving wheels 60 together with the motive power of the engine 20. The third traveling mode is, for example, a mode that is set when the vehicle 1 travels on an expressway or the like at a predetermined speed or more.

[First PDU]

Figure 2:
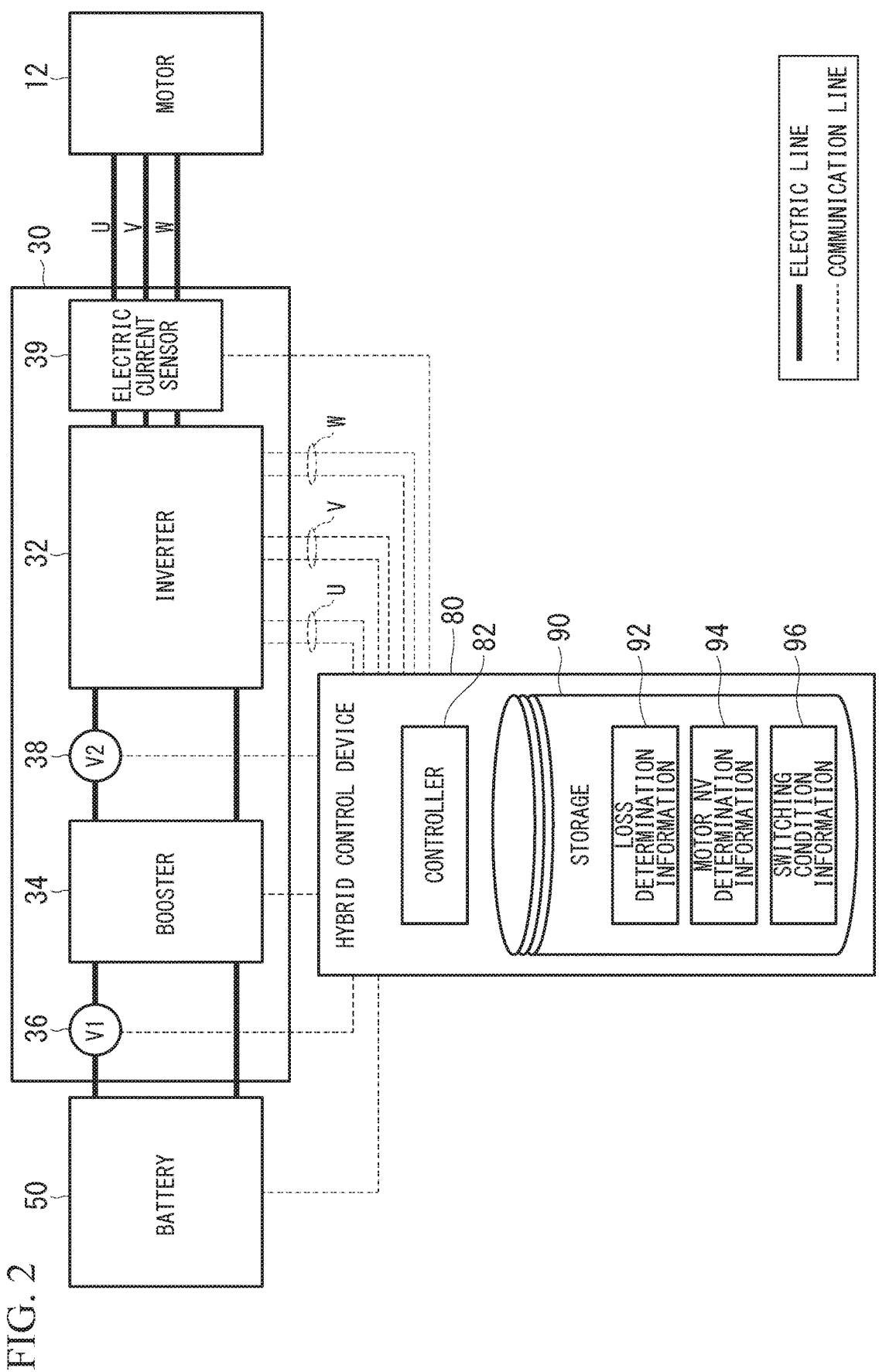
FIG. 2 is a diagram showing an example of a configuration centering on a first PDU.

FIG. 2 is a diagram showing an example of a configuration centering on the first PDU 30. The first PDU 30 includes, for example, an inverter 32, a booster 34, a first voltage sensor 36, a second voltage sensor 38, and an electric current sensor 39. A first side of the inverter 32 is electrically connected to the motor 12 via an electric line. At a first side of the inverter 32, a UVW phase of the inverter 32 is connected to the motor 12. The second side of the inverter 32 is connected to the first side of the booster 34 via an electric line. A second side of the booster 34 is connected to the battery 50.

The first voltage sensor 36 is connected between the battery 50 and the booster 34 and detects a voltage input to the booster 34. The second voltage sensor 38 is connected between the booster 34 and the inverter 32 and detects a voltage input to the inverter 32. A detection result of the first voltage sensor 36 and a detection result of the second voltage sensor 38 are output to the hybrid control device 80.

The electric current sensor 39 is provided between the inverter 32 and the motor 12. The electric current sensor 39 detects, for example, respective electric currents of a U phase, a V phase, and a W phase, and outputs detection results to the hybrid control device 80. The electric current sensor 39 is connected to the hybrid control device 80 via a communication line.

The hybrid control device 80 is connected to the inverter 32 via a communication line. The controller 82 of the hybrid control device 80 controls a switching element related to the UVW phase of the inverter 32 so that the switching element is in an ON state or an OFF state.

For example, the controller 82 performs pulse width modulation (PWM) control or one-pulse control (rectangular wave control) on the basis of a process to be described below.

[Flowchart]

Figure 3:
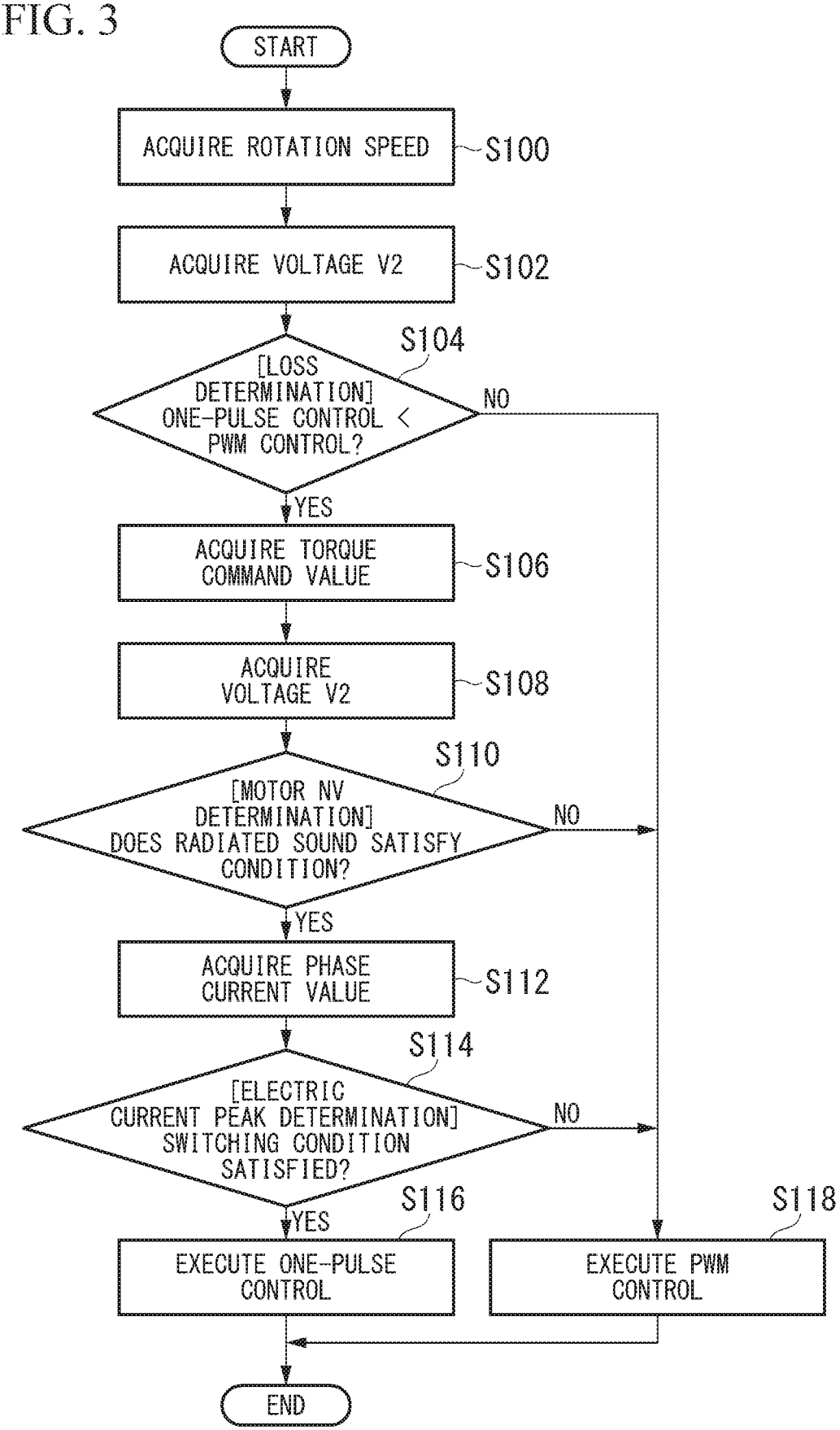
FIG. 3 is a flowchart showing an example of a flow of a process to be executed by a controller.

FIG. 3 is a flowchart showing an example of a flow of a process to be executed by the controller 82. For example, the process of FIG. 3 is a process that is iteratively executed when the motor 12 is in a state in which an electric current is applied thereto. For example, the process of FIG. 3 is a process that is executed when the PWM control is being executed. When the one-pulse control is being executed, for example, the processing of steps S112 and S114 of FIG. 3 is omitted. In the description of FIG. 3, an outline of each process will be described and details of respective processes ([loss determination], [motor NV determination], and [switching determination]) will be described below.

First, the controller 82 acquires a rotation speed of the motor 12 from the rotation angle sensor 14 (step S100). Next, the controller 82 acquires a voltage V2 that is a detection result of the second voltage sensor 38 (step S102).

Next, the controller 82 determines whether or not the electric power loss of the one-pulse control is less than the electric power loss of the PWM control on the basis of the rotation speed of the motor 12 and the voltage V2 with reference to the loss determination information 92 to be described below (step S104). When the loss of the one-pulse control is not less than the electric power loss of the PWM control (when the loss of the PWM control is less than the electric power loss of the one-pulse control), the controller 82 executes the PWM control (step S118). That is, the PWM control is continued.

When the electric power loss of the one-pulse control is less than the electric power loss of the PWM control, the controller 82 acquires a torque command value (step S106). Next, the controller 82 acquires the voltage V2 that is a detection result of the second voltage sensor 28 (step S108). As the voltage V2 of step S108, the voltage acquired in step S102 may be used.

Next, the controller 82 determines whether or not the motor NV (noise or vibration) of the one-pulse control satisfies a criterion on the basis of the torque command value and the voltage V with reference to the motor NV determination information 94 to be described below (step S110). When the motor NV of the one-pulse control does not satisfy the criterion, the process proceeds to the processing of step S118.

When the motor NV of the one-pulse control satisfies the criterion, the controller 82 acquires a phase current value applied to the motor 12 (step S112). The controller 82 determines whether or not the acquired phase current value satisfies a switching condition with reference to the switching condition information 96 (step S114). The switching condition is, for example, that a phase current value (an electric current value of any one of the U phase, the V phase, and the W phase, or a sum value thereof) acquired at a certain timing is less than or equal to a threshold value. This threshold value is included in the switching condition information 96 (details will be described below with reference to FIGS. 13 to 16).

In the processing of step S114, it may be determined whether or not a predetermined index satisfies the switching condition instead of the phase current value. The predetermined index is information about an electric current given to the motor 12 at the next processing timing such as a torque command value or an electric current command value based on the torque command value. In the processing of step S114, it may be determined that the switching condition is satisfied when a plurality of different types of indices satisfy respective threshold values according to the types of indices.

When the switching condition is not satisfied, the process proceeds to the processing of step S118. When the switching condition is satisfied, the controller 82 executes one-pulse control (step S116). That is, the controller 82 does not switch the control to the one-pulse control when the switching condition is not satisfied and switches the control to the one-pulse control when the switching condition is satisfied in the processing of the next and subsequent routines (when a change from a state in which the electric current index exceeds the threshold value to a state in which the electric current index is less than or equal to the threshold value is made). Thereby, the processing of one routine of the present flowchart ends.

[Loss Determination]

Figures 4, 5:
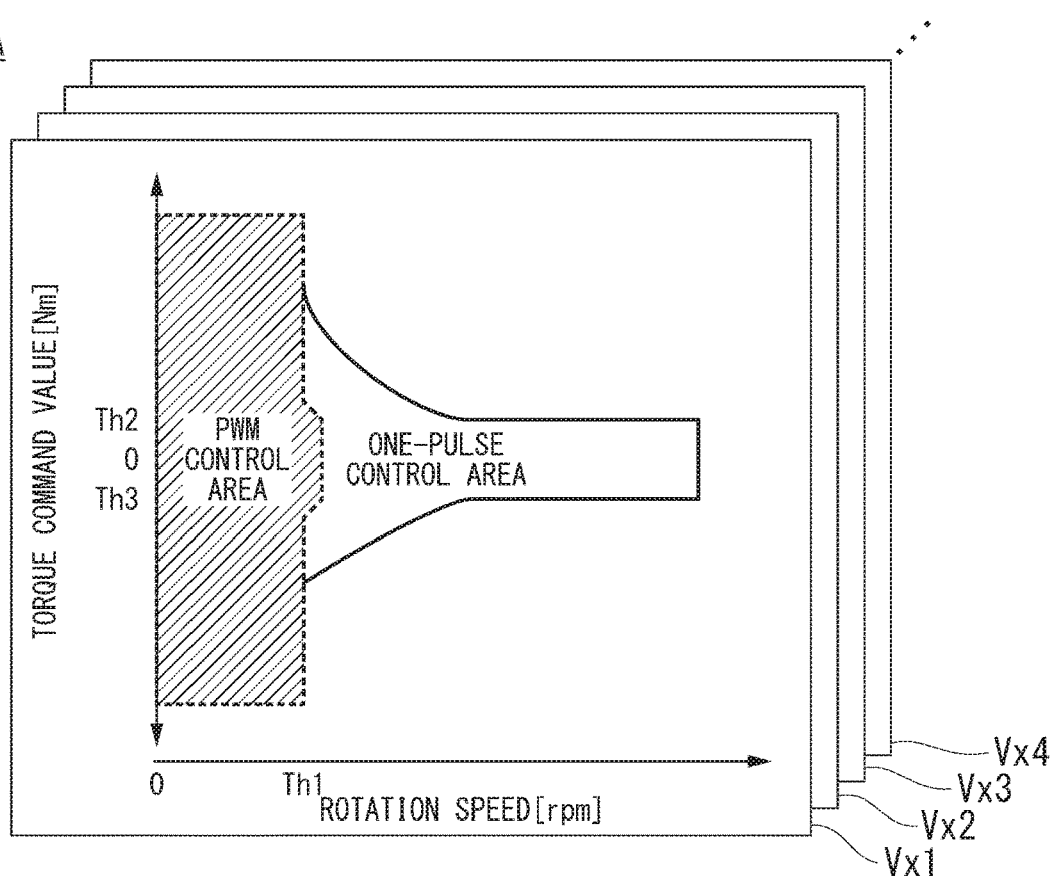
FIG. 4 is a diagram showing an example of details of loss determination information.
FIG. 5 is a diagram showing another example (part 1) of details of the loss determination information.

The controller 82 determines whether or not the electric power loss of the one-pulse control is less than the electric power loss of the PWM control on the basis of the rotation speed of the motor 12 and the voltage V2 with reference to the loss determination information 92. FIG. 4 is a diagram showing an example of details of the loss determination information 92. For example, the loss determination information 92 is information in which information indicating the PWM control (first information) or information indicating the one-pulse control (second information) is associated with the rotation speed of the motor 12 and the voltage input to the inverter 32. In the loss determination information 92, the voltage output by the inverter 32 may be used instead of the voltage input to the inverter 32.

The fact that the information indicating the PWM control is associated indicates that the PWM control is executed at the rotation speed and the voltage thereof and the electric power loss of the PWM control is less than the electric power loss of a one-pulse control area when the motor 12 has been controlled. The fact that the information indicating the one-pulse control is associated indicates that the one-pulse control is executed at the rotation speed and the voltage thereof and the electric power loss of the one-pulse control is less than the electric power loss of the PWM control when the motor 12 has been controlled. Each control area may be set in the loss determination information 92 in consideration of only the switching loss.

The controller 82 may further determine whether or not the electric power loss of the one-pulse control is less than the electric power loss of the PWM control in consideration of the torque command value. For example, when the processing performance of the controller 82 satisfies a predetermined condition, the torque command value is considered. The torque command value is a torque command value derived on the basis of a degree of accelerator opening according to an operation of an accelerator pedal by the occupant and a vehicle speed acquired from the vehicle speed sensor. The controller 82 determines torque to be output to a drive shaft of the motor 12 on the basis of the vehicle speed and the degree of accelerator opening acquired from the accelerator pedal opening degree sensor and derives the torque command value on the basis of the determined torque. When the torque command value is considered, the controller 82 refers to loss determination information in which the information indicating the PWM control or the information indicating the one-pulse control is associated with the voltage, the rotation speed of the motor 12, and the torque command value.

FIG. 5 is a diagram showing another example (part 1) of details of the loss determination information 92. For example, the loss determination information 92A may be a map in which a PWM control area (an area indicating first information) or a one-pulse control area (an area indicating second information) is associated with the rotation speed of the motor 12 and the torque command value. For example, the loss determination information 92A is provided for each voltage. The PWM control area or the one-pulse control area is associated with an output enable area indicating the torque and the rotation speed that can be output by the motor 12 at a target voltage. The PWM control area is an area where PWM control is selected and the one-pulse control area is an area where one-pulse control is selected.

For example, in the loss determination information 92 associated with a voltage Vx1 of FIG. 5, the one-pulse control area is set in an area where the rotation speed is greater than or equal to a threshold value Th1 and the PWM control area is set in an area where the rotation speed is less than the threshold value Th1.

However, depending on a magnitude of the voltage V2, the PWM control area may also be set in the area where the rotation speed is greater than or equal to the threshold value Th1 as shown in FIG. 5. For example, when the rotation speed is greater than or equal to the threshold value Th1 and the torque command value is included in a range from a threshold value Th2 to a threshold value Th3, the controller 82 determines that the electric power loss of the PWM control is less than the electric power loss of the one-pulse control.

The one-pulse control area may also be set in an area where the rotation speed is less than the threshold value Th1. In this case, for example, when the rotation speed is less than the threshold value Th1 and the torque command value is included in a range from a threshold value Th4 (not shown) to a threshold value Th5 (not shown), the controller 82 may determine that the electric power loss of the one-pulse control is less than the electric power loss of the PWM control.

Figure 6:
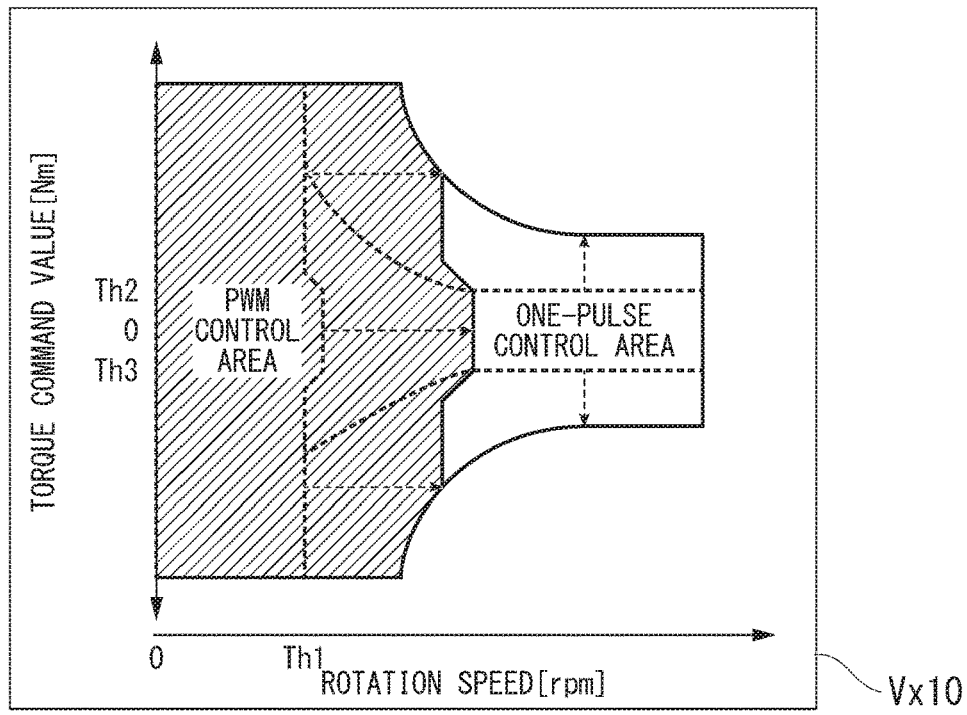
FIG. 6 is a diagram showing another example (part 2) of details of the loss determination information.

FIG. 6 is a diagram showing another example (part 2) of details of the loss determination information 92. For example, in the loss determination information 92 associated with a voltage Vx10 (a voltage higher than the voltage Vx1) of FIG. 6, the one-pulse control area expands in a direction in which an absolute value of the torque command value increases and the PWM control area expands in a direction in which the rotation speed increases. That is, as a value of the voltage V2 increases, the one-pulse control area expands in the direction in which the absolute value of the torque command value increases and the PWM control area expands in the direction in which the rotation speed increases. In this manner, in the loss determination information 92, the one-pulse control area or the PWM control area is set with respect to the rotation speed of the motor 12 and the torque command value for each voltage.

As described above, the controller 82 can more accurately make a determination with respect to the electric power loss by referring to the loss determination information 92A. The controller 82 can more accurately make a determination with respect to the electric power loss in consideration of the torque.

For example, the loss determination information 92 is generated by the generation device 200. For example, the generation device 200 analyzes the electric power loss of electric power [W] when the motor 12 is operated while each parameter to be applied to the motor 12 is shifted and generates the loss determination information 92 on the basis of an analysis result. The parameters are, for example, the torque command value given to the motor 12, the rotation speed of the motor 12, and the voltage input to the motor 12.

Figure 7:
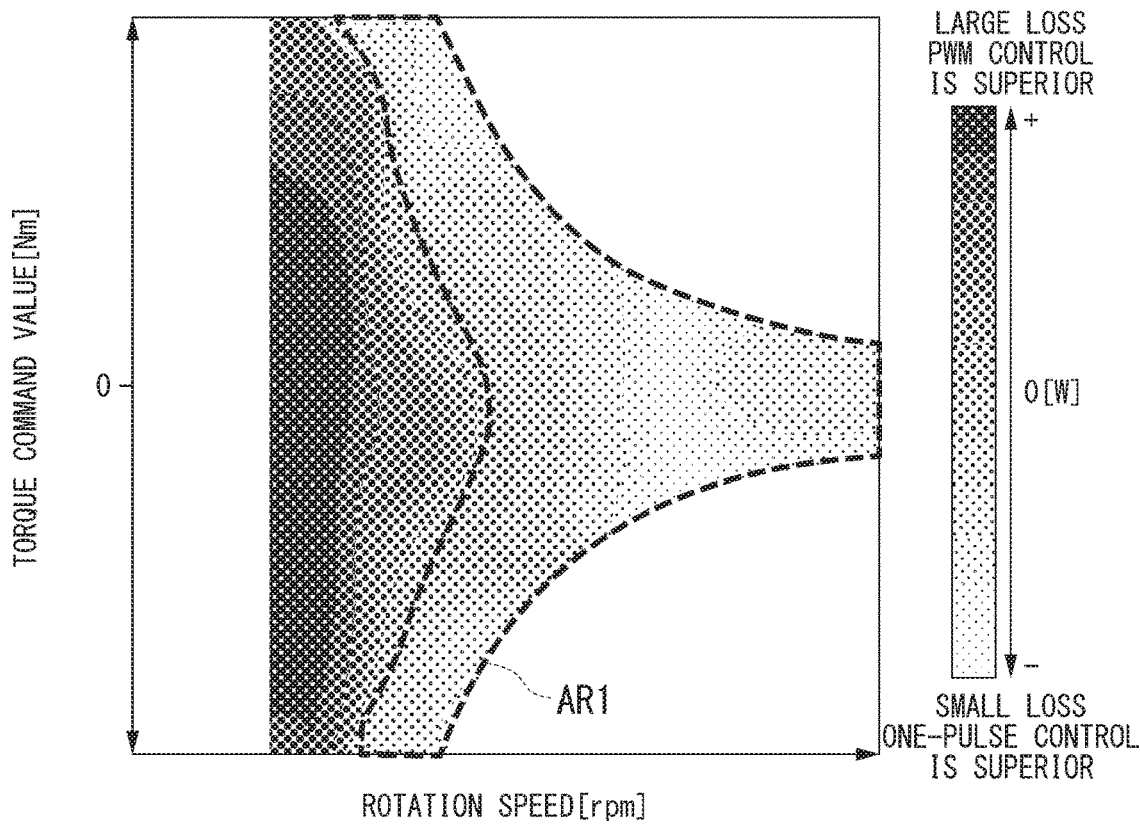
FIG. 7 is a diagram showing a distribution of electric power loss when each parameter is set in a motor and one-pulse control is performed.

FIG. 7 is a diagram showing a distribution of electric power loss when each parameter is set in the motor 12 and one-pulse control is performed. FIG. 7 shows the distribution of electric power loss of electric power when a predetermined voltage has been applied. The vertical axis of FIG. 7 represents a torque command value and the horizontal axis of FIG. 7 represents a rotation speed. The generation device 200 generates the loss determination information 92 by setting an area indicating electric power loss greater than or equal to a threshold value in the PWM control area and setting an area indicating electric power loss less than the threshold value in a one-pulse control area AR1 in the distribution as shown in FIG. 7. Then, the generated loss determination information 92 is stored in the storage 90 of the hybrid control device 80.

In this manner, the controller 82 can accurately determine whether or not control is switched to one-pulse control to minimize electric power loss by referring to the loss determination information 92 generated by the generation device 200. As a result, the controller 82 can more accurately minimize fuel consumption.

[Motor NV Determination]

Figures 8, 9:
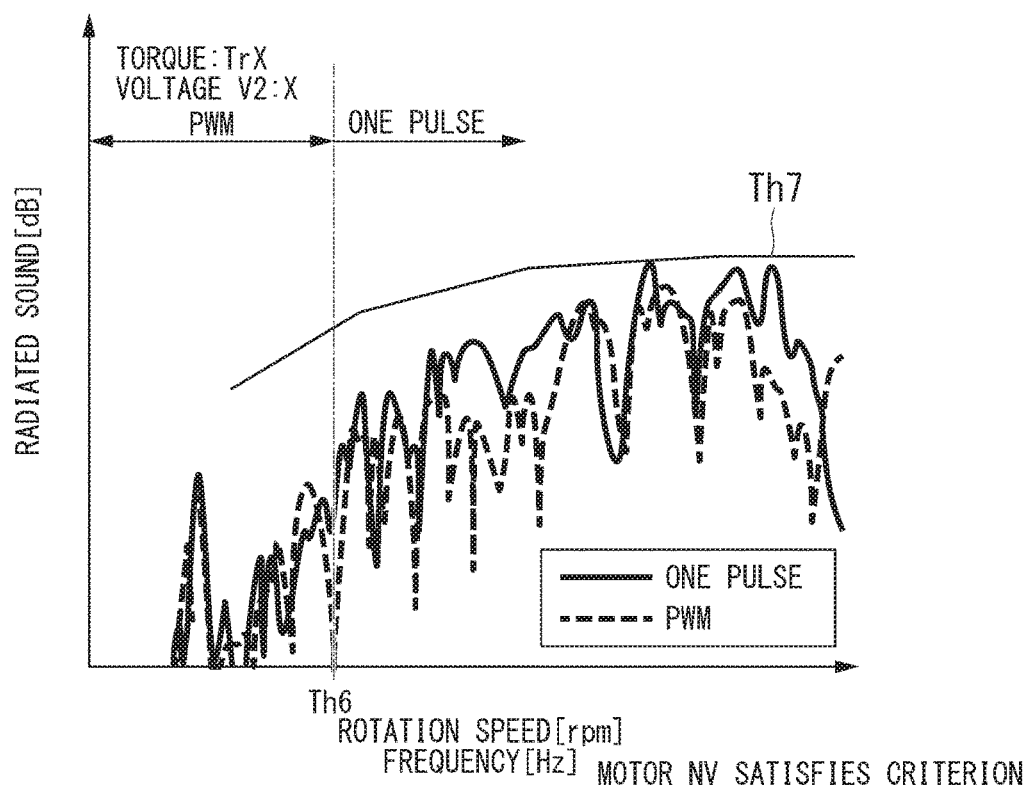
FIG. 8 is a diagram showing an example of details of motor noise/vibration (NV) determination information.
FIG. 9 is a diagram showing a distribution of radiated sound when the motor has been operated in one-pulse control.

The controller 82 determines whether or not the motor NV of the one-pulse control satisfies a criterion on the basis of the torque command value and the voltage V with reference to the motor NV determination information 94. FIG. 8 is a diagram showing an example of details of the motor NV determination information 94. The motor NV determination information 94 is information in which control details (one-pulse control (third information) or PWM control (fourth information)) that satisfy the criterion of the motor NV are associated with the torque command value and the voltage input to the motor 12.

Figure 10:
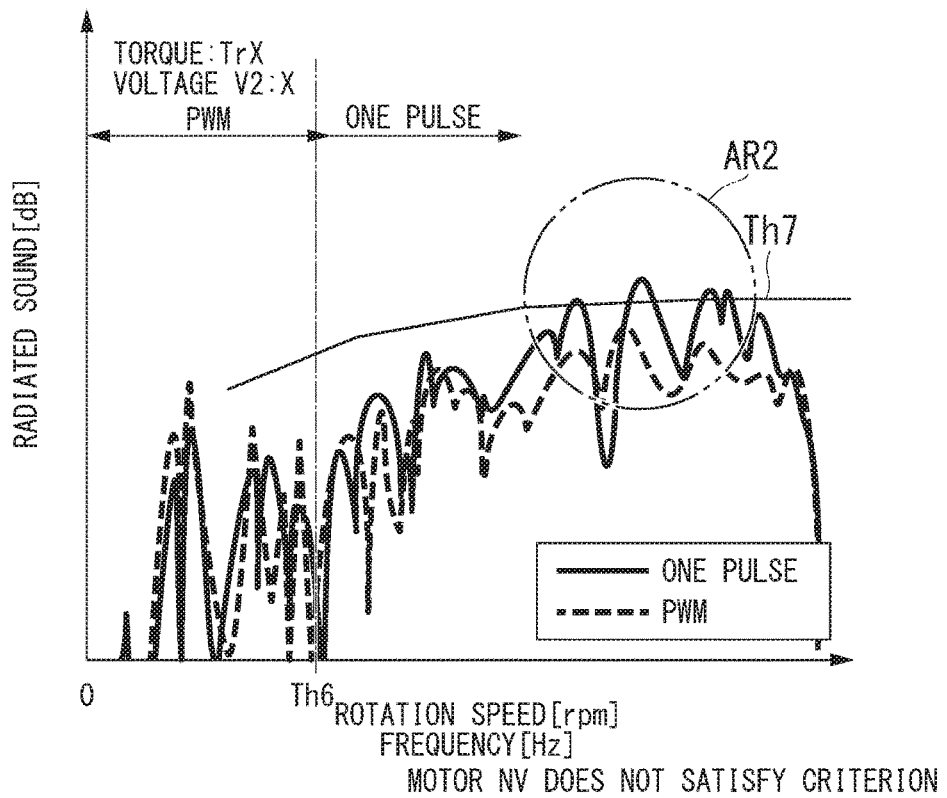
FIG. 10 is a diagram showing a distribution of radiated sound when the motor has been operated in the one-pulse control.
Figure 11:
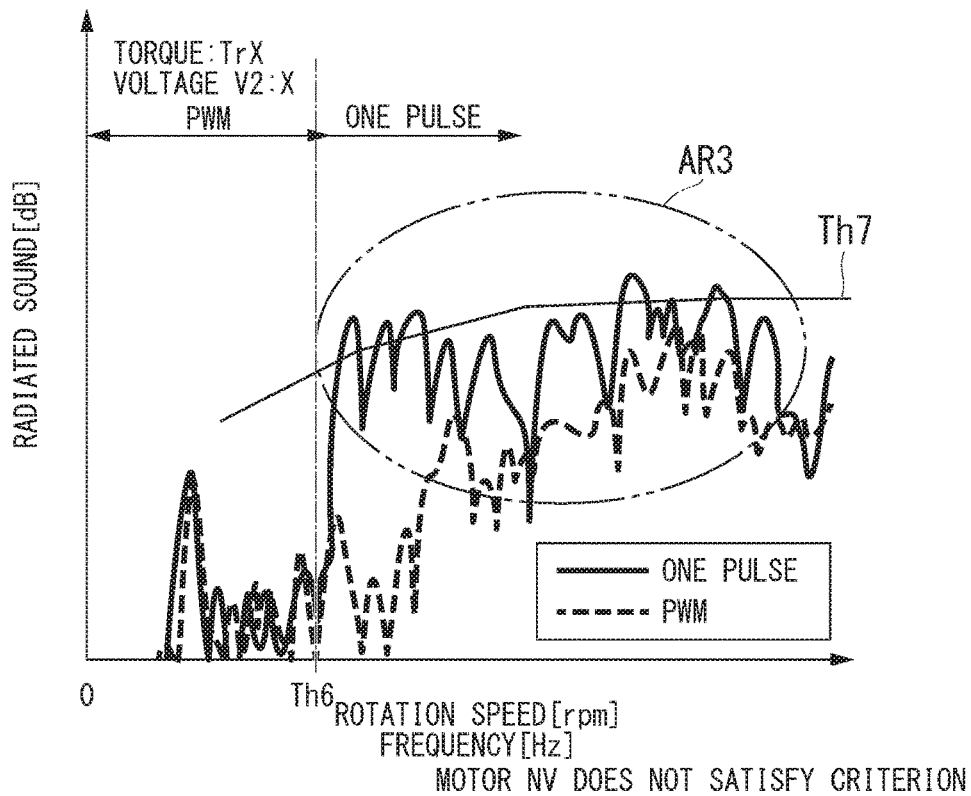
FIG. 11 is a diagram showing a distribution of radiated sound when the motor has been operated in the one-pulse control.

Hereinafter, a case in which the one-pulse control satisfies the criterion of the motor NV and a case in which the one-pulse control does not satisfy the criterion of the motor NV will be described with reference to FIGS. 9 to 11. FIGS. 9 to 11 show a change in a magnitude of a radiated sound when the rotation speed of the motor 12 is changed for each combination of a predetermined torque command value and a magnitude of a predetermined voltage V2 in the one-pulse control or the PWM control. The vertical axis of FIGS. 9 to 11 represents a radiated sound [dB], and the horizontal axis of FIGS. 9 to 11 indicates a rotation speed of the motor 12 or a power-supply frequency [Hz] of the motor 12. The radiated sound is, for example, a radiated sound of a $36^{th}$-order component observed in the interior of the vehicle.

An area where the rotation speed of the motor 12 is greater than or equal to a threshold value Th6 is an area set as the one-pulse control area in the loss determination information 92 (an area where the third information is set) and an area where the rotation speed of the motor 12 is less than a threshold value Th5 is an area set as the PWM control area in the loss determination information 92 (an area where the fourth information is set). A threshold value Th7 is a threshold value indicating a criterion of the motor NV defined for each rotation speed of the motor 12. The threshold value Th7 is, for example, a magnitude obtained by adding a margin to the magnitude of a sound with which a person feels uncomfortable.

In an area where the rotation speed of the motor 12 is greater than or equal to the threshold value Th6 when the one-pulse control has been executed, it is determined that the motor NV of the one-pulse control satisfies the criterion if the radiated sound is equal to or less than the threshold value Th7. In the area where the rotation speed of the motor 12 is greater than or equal to the threshold value Th6 when the one-pulse control has been executed, it is determined that the motor NV of the one-pulse control does not satisfy the criterion if the radiated sound is not less than or equal to the threshold value Th7.

FIG. 9 is a diagram showing a distribution of radiated sound when the motor 12 has been operated in one-pulse control if the torque command value is TrX and the magnitude of the voltage V2 is X. In the example of FIG. 9, the motor NV of the one-pulse control satisfies a criterion because the radiated sound is less than or equal to the threshold value Th7 in an area where the rotation speed of the motor 12 is greater than or equal to the threshold value Th6.

FIG. 10 is a diagram showing the distribution of radiated sound when the motor 12 has been operated in one-pulse control if the torque command value is TrX1 (for example, torque that is three times TrX) and the magnitude of the voltage V2 is X. In the example of FIG. 10, the motor NV of the one-pulse control does not satisfy the criterion because the radiated sound is not less than or equal to the threshold value Th7 as shown in an area AR2 in an area where the rotation speed of the motor 12 is greater than or equal to the threshold value Th6. Although the number of times of switching of the switching element in the one-pulse control is smaller than that in the PWM control, an amount of radiated sound increases because an electric current waveform cannot be formed with high accuracy, the electric current waveform is distorted, and a higher harmonic current component that does not contribute to torque increases. That is, in the one-pulse control, an amount of radiated sound may increase in exchange for minimization of electric power loss.

FIG. 11 is a diagram showing a distribution of radiated sound when the motor 12 has been operated in one-pulse control if the torque command value is TrX and the magnitude of the voltage V2 is X1 (a voltage that is approximately twice to 2.5 times X). In the example of FIG. 11, the motor NV of the one-pulse control does not satisfy the criterion because the radiated sound is not less than or equal to the threshold value Th7 as shown in an area AR3 in an area where the rotation speed of the motor 12 is greater than or equal to the threshold value Th6.

The generation device 200 generates information indicating whether or not the one-pulse control can be selected with respect to the torque command value and the magnitude of the voltage V2 on the basis of the above-described distribution of radiated sound and generates the motor NV determination information 94 on the basis of the generated information. The generated motor NV determination information 94 is stored in the storage 90 of the hybrid control device 80.

Figure 12:
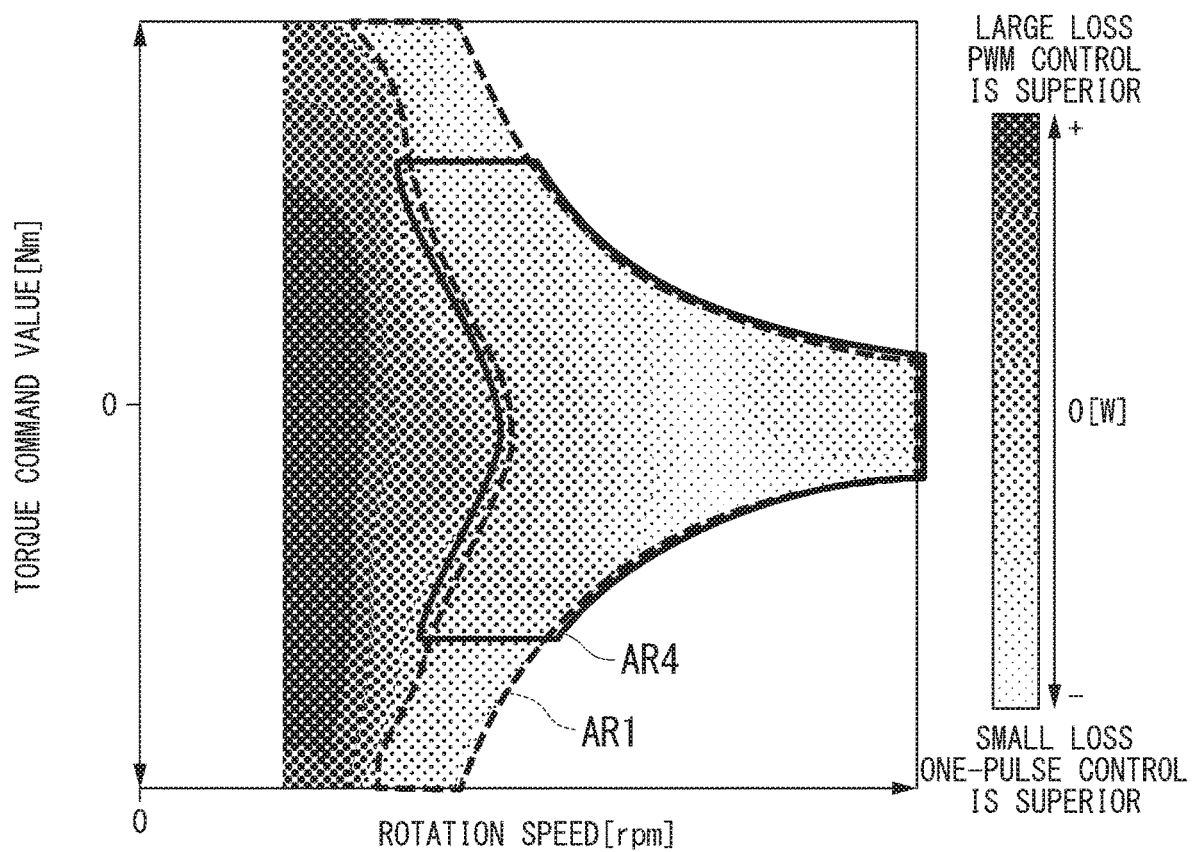
FIG. 12 is a diagram showing an example of a case in which an area that satisfies a criterion of the motor NV has been applied.

An example of a case in which an area that satisfies the above-described criterion of the motor NV is applied to the distribution of electric power loss when the one-pulse control has been performed is shown in FIG. 12. Description of FIG. 12 similar to that of FIG. 7 will be omitted. A motor NV criterion area AR4 where the motor NV satisfies the criterion is included in a one-pulse control area AR1 in the loss determination. In other words, the motor NV criterion area AR4 is an area that is set so that the one-pulse control area AR1 is limited.

In this manner, the controller 82 can more accurately determine whether or not the control is switched to the one-pulse control in a state in which the motor NV has satisfied the criterion by referring to the motor NV determination information 94 generated by the generation device 200. As a result, the controller 82 can improve the merchantability while minimizing fuel consumption.

[Switching Determination]

The controller 82 determines whether or not the acquired phase current value satisfies the switching condition with reference to the switching condition information 96. A concept when the switching condition of the switching determination is set will be described with reference to FIGS. 13 to 16.

When the one-pulse control is continuously performed (for example, at a timing when a predetermined period of time has elapsed from the timing at which the control is switched from the PWM control to the one-pulse control), the phase current value becomes an electric current value intended by the controller 82 (an electric current value set as a control target). However, when the control is switched from the PWM control to the one-pulse control, the phase current value may not be the electric current value intended by the controller 82.

Figure 13:
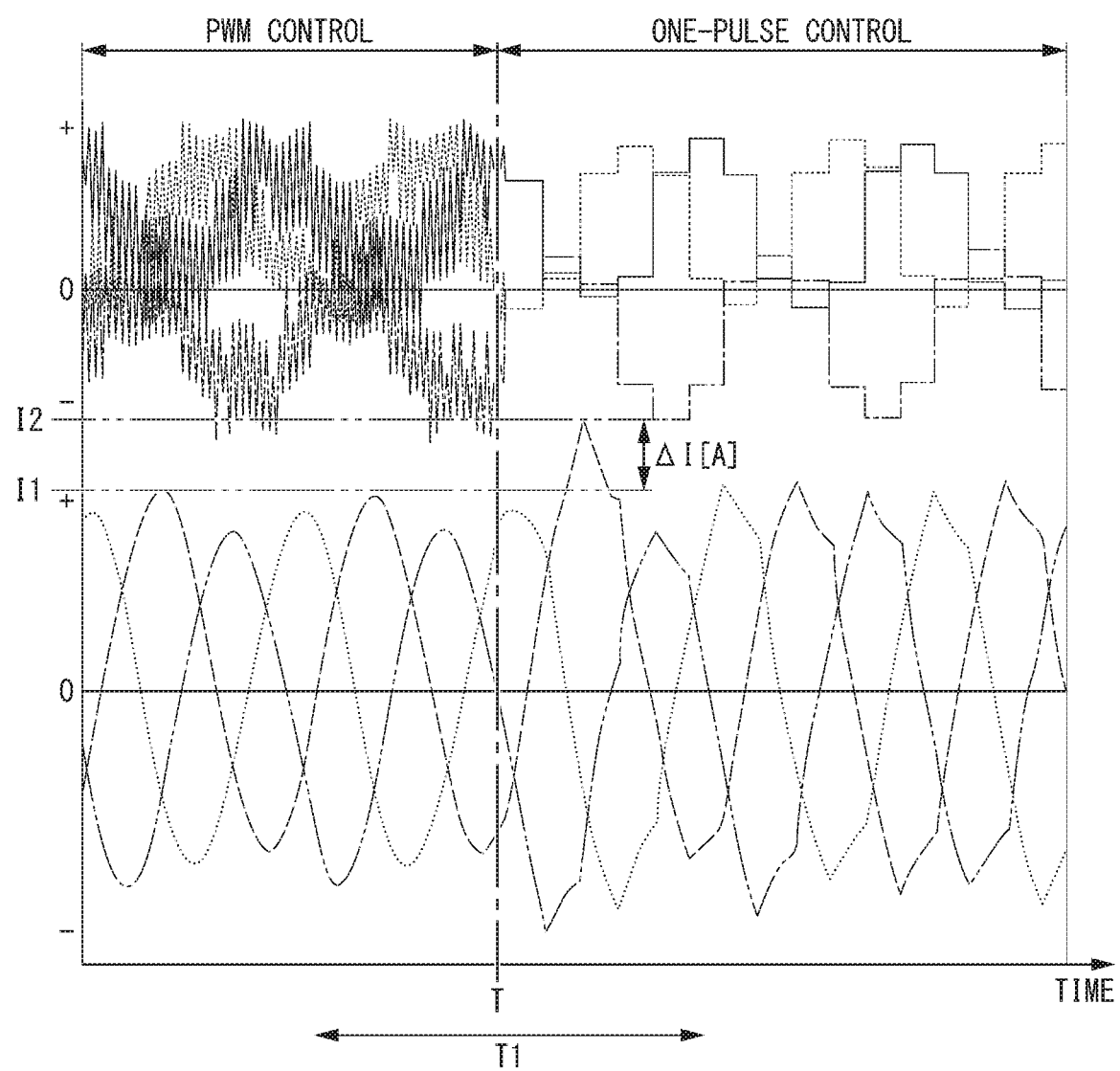
FIG. 13 is a diagram showing an example of a change in a phase current value at a timing when control is switched from PWM control to one-pulse control.

FIG. 13 is a diagram showing an example of a change in a phase current value at a timing when control is switched from PWM control to one-pulse control. A time T is a time at which the control is switched from the PWM control to the one-pulse control. The upper diagram of FIG. 13 shows a pulse waveform. This waveform is a waveform when the motor 12 outputs relatively high torque among torques that can be output. The pulse is a pulse generated by the controller 82 controlling the switching element of the inverter 32 so that the switching element is in an ON state or an OFF state. In the upper diagram of FIG. 13, the vertical axis represents a voltage and the horizontal axis represents time. The lower diagram of FIG. 13 shows waveforms of phase currents (a U phase, a V phase, and a W phase). In FIG. 13, the vertical axis represents a phase current value, and the horizontal axis represents time. In the following description, for example, an intended electric current value (an electric current value of a control target) is assumed to be equivalent before and after time T.

At the time T and after (immediately after) the time T, a change to a phase current value (I2) different from a phase current value (I1) intended by the controller 82 may be made. For example, as shown in FIG. 13, the phase current value may be larger than the intended phase current value. That is, the phase current value immediately after the elapse of the time T is incremented by a predetermined electric current $\Delta I$ due to an influence of the switching of control. When the control is switched to one-pulse control, which is control sparser than the PWM control, a detection error of the electric current sensor 39 is affected by the one-pulse control. This is because the electric current is controlled to offset the detection result of the electric current sensor 39 and the electric current value that is a control target in the sparse one-pulse control. For example, during a predetermined period of time T1 including the time T, a degree of increase in the electric current value that is the control target set by the controller 82 (an electric current value that is the control target to be increased between control cycles) is assumed to be sufficiently less than the predetermined electric current $\Delta I$.

Figure 14:
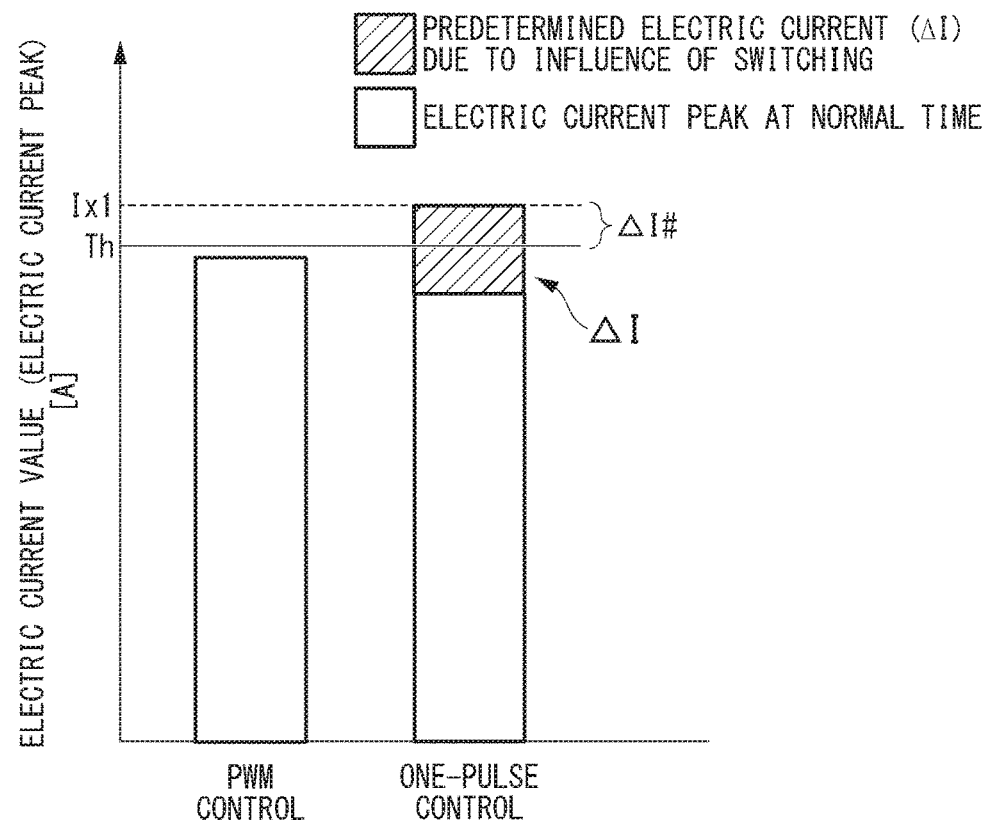
FIG. 14 is a diagram shown to compare an electric current peak of the PWM control at a normal time, an electric current peak of the one-pulse control at the normal time, and an electric current (ΔI) due to an influence of switching to the one-pulse control.

FIG. 14 is a diagram shown to compare an electric current peak of the PWM control at a normal time, an electric current peak of the one-pulse control at a normal time, and an electric current ($\Delta I$) due to an influence of switching to the one-pulse control. The normal time is a timing different from the timing at which the control has been switched. The vertical axis of FIG. 14 indicates an electric current value

[A]. Even if the electric current peak of the PWM control at the normal time is less than or equal to the threshold value Th, the electric current peak may be (Electric current value Ix1) greater than or equal to the threshold value Th because the electric current peak immediately after the switching time T includes the predetermined electric current ΔI due to the influence of the switching when the control is switched to the one-pulse control. For example, when the electric current peak is greater than or equal to the threshold value Th, the inverter 32 may be affected or the motor 12 may be demagnetized. An electric current ΔI # of FIG. 14 is a difference between the threshold value Th and the electric current value Ix1 or a value obtained by adding an electric current of a margin (an electric current value that is a control target to be increased between control cycles) to the difference.

Figure 15:
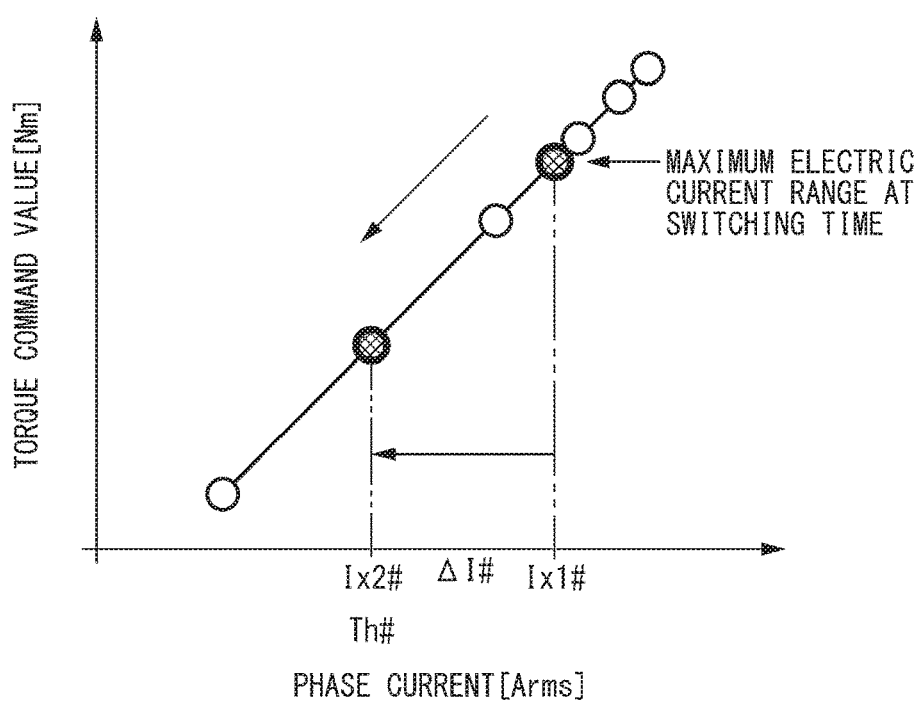
FIG. 15 is a diagram showing a maximum electric current range.

Thus, as shown in FIG. 15, the switching condition used when control is switched from the PWM control to the one-pulse control is set on the basis of a result of a previous experiment or the like. The vertical axis of FIG. 15 represents a torque command value and the horizontal axis of FIG. 15 represents a phase current value [Arms (an effective value of an electric current)]. An electric current value Ix1 # of FIG. 15 is an effective value of the phase current associated with the electric current value Ix1 of FIG. 14. As shown in FIG. 15, an effective value Ix2 # of the phase current, a torque command value, and the like are derived so that an electric current associated with an amount of an electric current ΔI # is minimized immediately after switching from the PWM control to the one-pulse control.

The phase current value associated with the derived effective value Ix2 # is set as the threshold value of the electric current value at the timing when the control is switched from the PWM control to the one-pulse control. For example, the generation device 200 sets the threshold value for the peak value of the phase current in the PWM control on the basis of the concept as described above. The generation device 200 may set information (a predetermined index) related to the electric current applied to the motor 12 at the next processing timing such as a torque command value or an electric current command value based on the torque command value on the basis of the above-described concept. Then, the set threshold value is stored as the switching condition information 96 in the storage 90.

Figure 16:
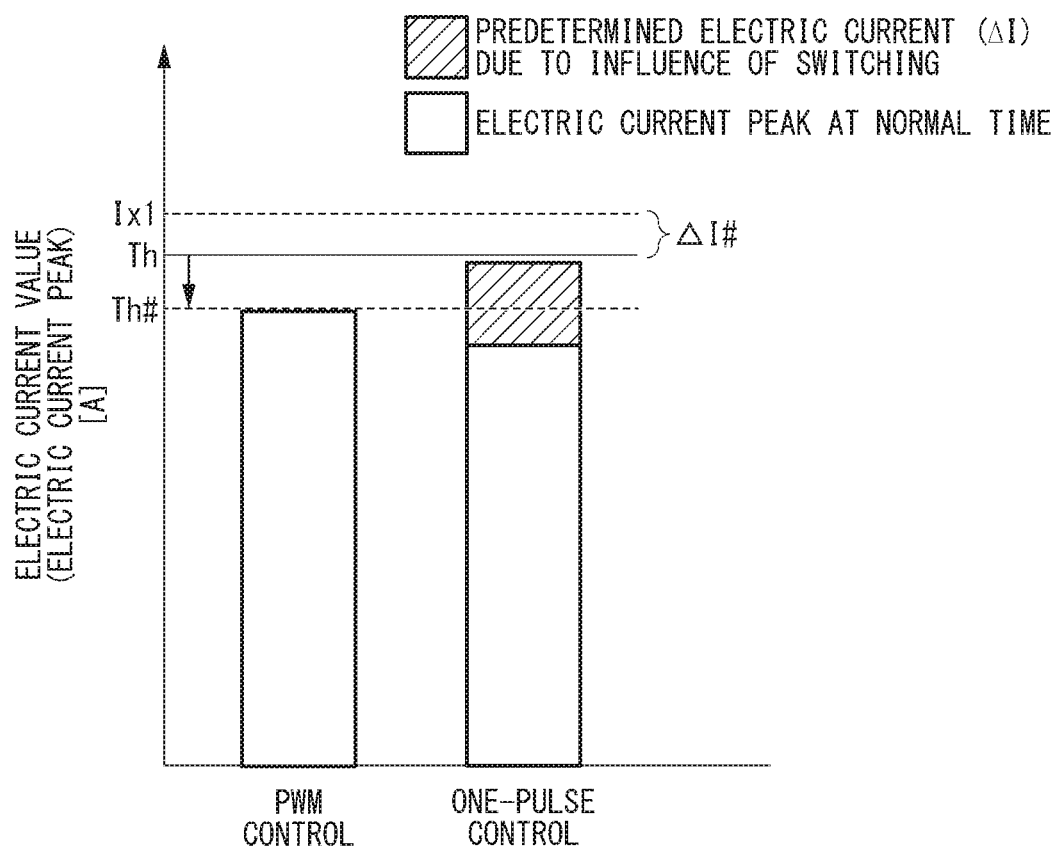
FIG. 16 is a diagram showing a threshold value set by a process described with reference to FIG. 15.

FIG. 16 is a diagram showing the threshold value set in the process described with reference to FIG. 15. Description similar to that of FIG. 14 will be omitted. The threshold value Th # derived to minimize an electric current associated with an amount of the electric current I # described with reference to FIG. 15 is set. The "threshold value Th #" is an example of a threshold value for an "electric current index". The "threshold value Th" is an example of a "specific index". For example, when the electric current value of the phase current of the PWM control is greater than or equal to the threshold value Th #, the controller 82 can control the electric current value so that a peak value of the phase current immediately after switching is not greater than or equal to the threshold value Th by preventing the control from being switched to the one-pulse control.

As described above, the controller 82 can determine whether or not the control is switched to the one-pulse control in a state in which the electric current peak satisfies a criterion by referring to the switching condition information 96 generated by the generation device 200. As a result, the controller 82 can improve the fuel efficiency and the merchantability while minimizing a negative influence on the inverter 32, the motor 12, and the like.

When it is determined that the acquired electric current value of the phase current (an index indicating the electric current) is greater than or equal to the threshold value Th #, the controller 82 may switch the control to the one-pulse control by controlling the phase current input to the motor 12 so that the electric current value is less than or equal to the threshold value Th # or decreasing the torque command value so that the electric current value is less than or equal to the threshold value Th #. A case where this process is applied to the flow of the process of the flowchart of FIG. 3 will be described with reference to FIG. 17.

Figure 17:
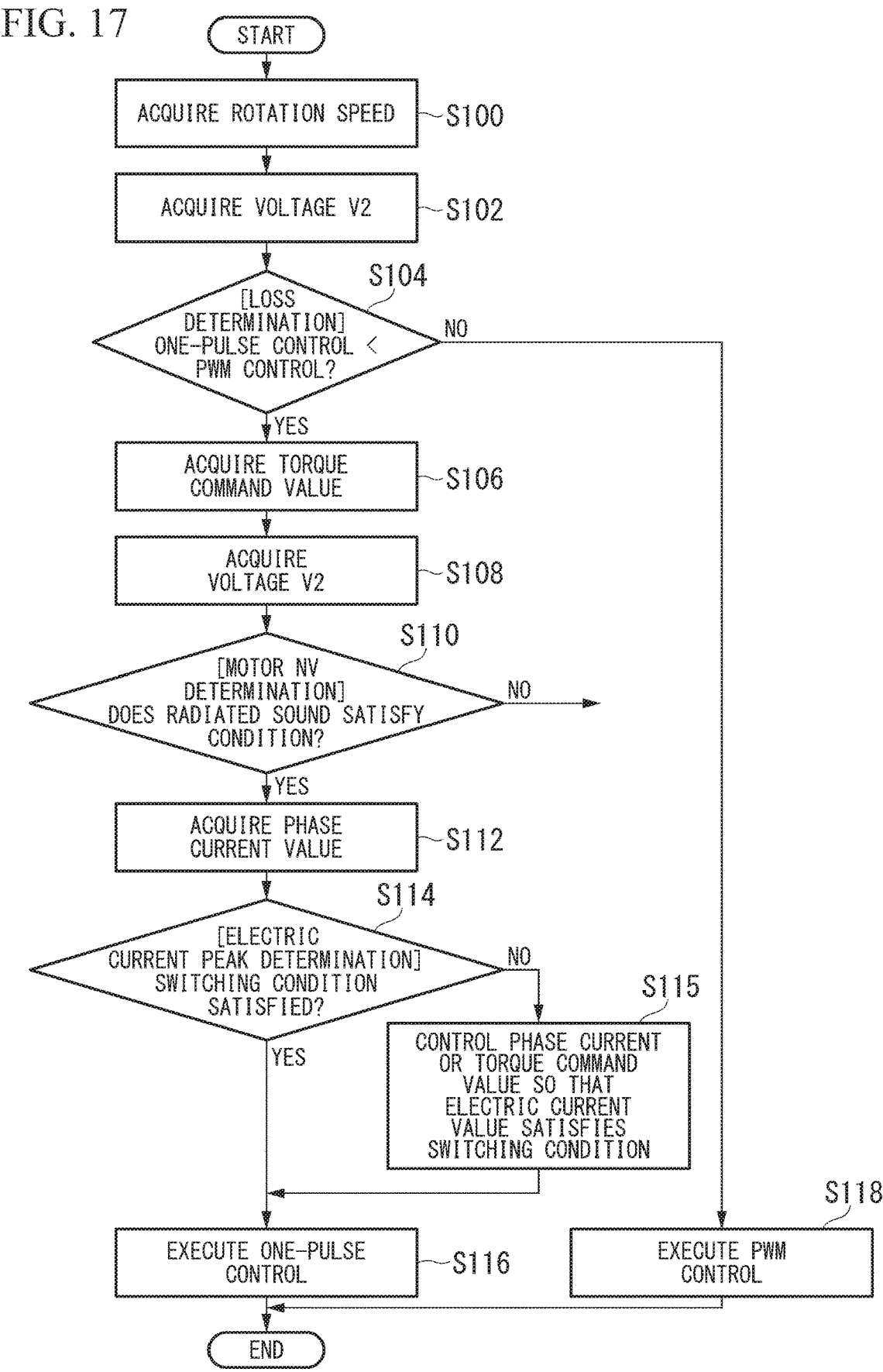
FIG. 17 is a flowchart showing another example of a flow of a process to be executed by a controller.

FIG. 17 is a flowchart showing another example of the flow of the process to be executed by the controller 82. Because the processing of steps S100 to S114, S116, and S118 of FIG. 17 is similar to the processing of steps S100 to S114, S116, and S118 of FIG. 3, description thereof will be omitted. When it is determined that the switching condition is not satisfied (for example, when it is determined that the acquired electric current value of the phase current is greater than or equal to the threshold value Th #) in step S114, the controller 82 controls the phase current or the torque command value so that the electric current value satisfies the switching condition (the electric current value is less than the threshold value Th #) (step S115) and executes the one-pulse control (step S116). That is, when the electric current index exceeds the threshold value, the controller 82 switches the control to the one-pulse control while controlling the electric current applied to the motor 12 so that the electric current index is less than or equal to the threshold value. Thereby, the processing of one routine of the present flowchart ends. In this manner, when the result of the loss determination and the result of the motor NV determination are positive by controlling the electric current value or the torque command value so that the switching condition is satisfied, the one-pulse control is executed. As a result, electric power loss is further minimized

[Conclusion]

For example, even if one-pulse control is performed in consideration of only the electric power loss, the merchantability may be reduced and hardware such as the inverter 32 and the motor 12 may be damaged. Thereby, the comfort of the user of the vehicle may be reduced or the life of the hardware may be shortened.

On the other hand, the control system according to the present embodiment includes the inverter 32 configured to convert DC power into AC power; the motor 12 configured to be driven using the AC power output by the inverter 32, and the controller 82 configured to control the AC power to be output to the motor 12 by controlling the inverter 32 and can minimize electric power loss and improve merchantability by performing switching between multi-pulse control and one-pulse control on the basis of electric power loss of the motor 12 and the inverter 32 and noise of the motor 12 and controlling the AC power. As a result, fuel efficiency and the comfort of the vehicle user are improved. Also, because the controller 82 switches the control to the one-pulse control in consideration of information about the electric current at the time of switching, damage to hardware can be minimized. As a result, the life of the hardware is extended.

MODIFIED EXAMPLES

Hereinafter, modified examples will be described. A hybrid control device 80 of a modified example will be described. The hybrid control device 80 stores, for example, control switching information 98 instead of (or in addition to) the loss determination information 92 and the motor NV determination information 94.

Figure 18:
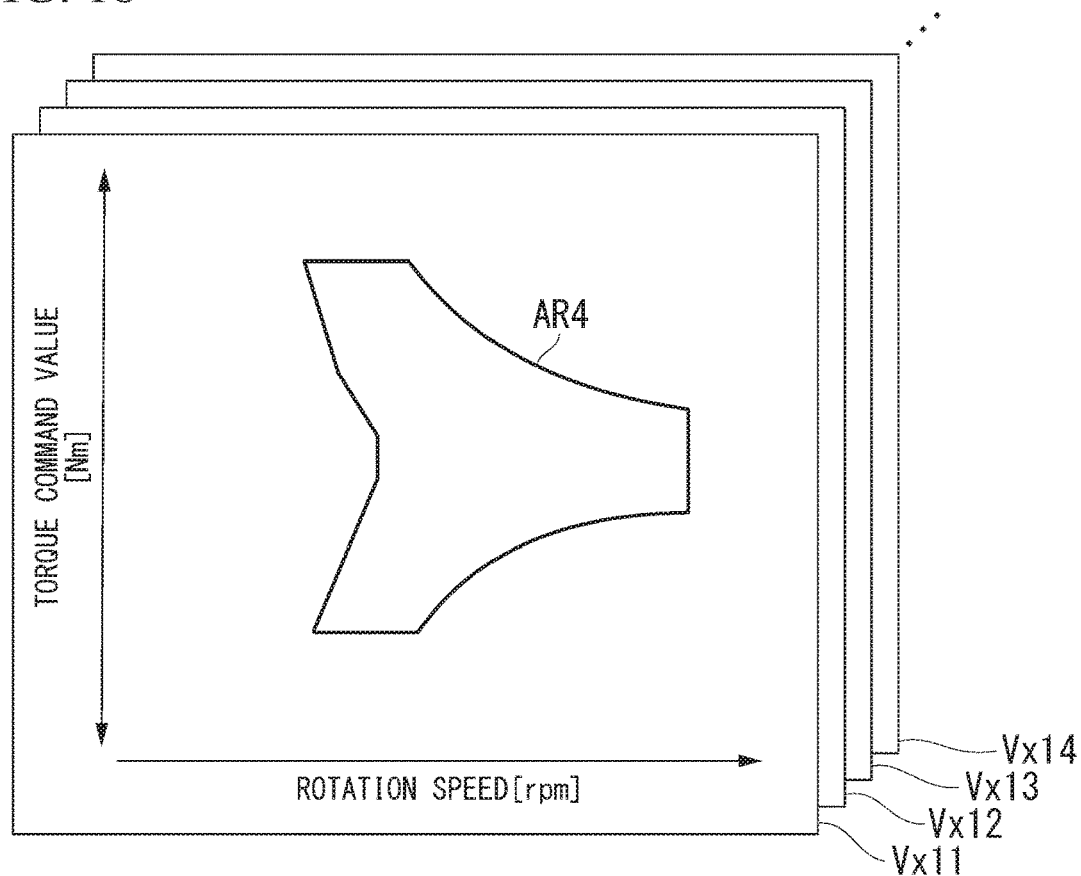
FIG. 18 is a diagram showing an example of details of control switching information.

FIG. 18 is a diagram showing an example of details of the control switching information 98. The control switching information 98 is, for example, information in which a one-pulse control area AR5 is associated with a rotation speed and a torque command value. The control switching information 98 is provided for each voltage. For example, the one-pulse control area AR5 is an area associated with the above-described motor NV reference area AR4.

The generation device 200 generates the control switching information 98 in which the one-pulse control area is set with reference to the motor NV reference area derived on the basis of a concept when the loss determination information 92 and the motor NV determination information 94 described above are generated. Then, the control switching information 98 is stored in the storage 90. The control switching information 98 is not limited to a two-dimensional map and may be a three-dimensional map, a function, or a learning model.

In the modified example, the controller 82 acquires, for example, the rotation speed of the motor 12, the voltage value of the voltage V2, and the torque command value. The controller 82 determines whether or not an application result is included in the one-pulse control area when the rotation speed of the motor 12, the voltage value of the voltage V2, and the torque command value that have been acquired have been applied to the control switching information 98 with reference to the control switching information 98. When the application result is included in the one-pulse control area and a positive result is obtained in the above-described electric current peak determination of step S114 of FIG. 3, control for switching from PWM control to one-pulse control is performed.

The hybrid control device 80 of the modified example described above can determine whether or not the control is switched to the multi-pulse control on the basis of the voltage acquired by the second voltage sensor 38 and the rotation speed of the motor 12 acquired by the rotation angle sensor 14 when the one-pulse control is being executed, determine whether or not the control is switched to the one-pulse control on the basis of the acquired voltage, the acquired rotation speed of the motor 12, and an electric current input to the motor 12 in the multi-pulse control when the multi-pulse control is being executed, and more easily determine whether or not control for switching from the PWM control to the one-pulse control is performed by controlling the first PDU 30 on the basis of a result of the determination. As a result, effects similar to those of the first embodiment can be obtained.

[Hardware Configuration]

Figure 19:
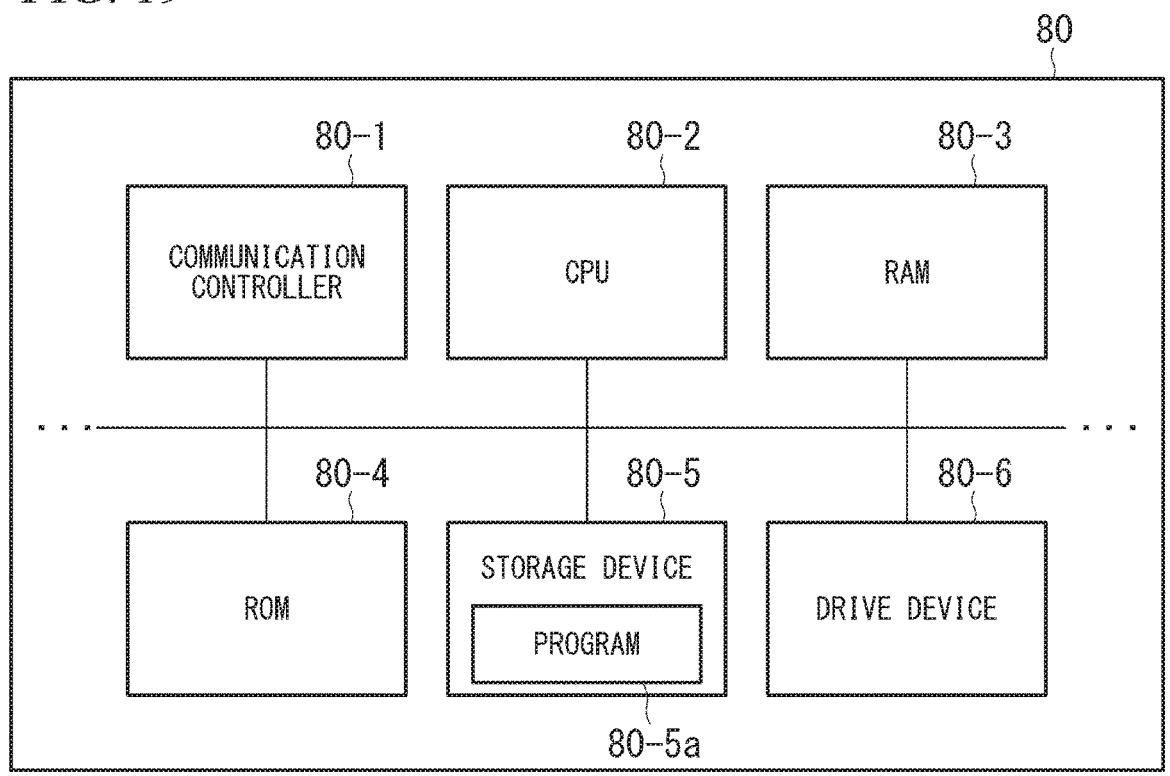
FIG. 19 is a diagram showing an example of a hardware configuration of a hybrid control device according to the embodiment.

FIG. 19 is a diagram showing an example of a hardware configuration of the hybrid control device 80 according to the embodiment. As shown in FIG. 19, the hybrid control device 80 has a configuration in which a communication controller 80-1, a CPU 80-2, a random-access memory (RAM) 80-3 used as a working memory, a read-only memory (ROM) 80-4 storing a boot program and the like, a storage device 80-5 such as a flash memory or a hard disk drive (HDD), a drive device 80-6, and the like are mutually connected by an internal bus or a dedicated communication line. The communication controller 80-1 communicates with components other than the hybrid control device 80. A program 80-5a executed by the CPU 80-2 is stored in the storage device 80-5. This program is loaded to the RAM 80-3 by a direct memory access (DMA) controller (not shown) or the like and executed by the CPU 80-2.

The embodiment described above can be represented as follows.

A control device, including:
an inverter configured to convert DC power into AC power;
an electric motor configured to be driven using the AC power output by the inverter; and
a storage device configured to store a program; and
a hardware processor,
wherein the hardware processor executes the program stored in the storage device to:
control AC power to be output to the electric motor by controlling the inverter; and
control the AC power by performing switching between multi-pulse control and one-pulse control on the basis of electric power loss of the electric motor and the inverter and noise of the electric motor.

Although modes for carrying out the present invention have been described above using embodiments, the present invention is not limited to the embodiments, and various modifications and substitutions can also be made without departing from the scope and spirit of the present invention.

What is claimed is:

1. A control system, comprising:
a power inverter configured to convert direct current (DC) power into alternating current (AC) power;
an electric motor configured to be driven using the AC power output by the power inverter; and
a controller configured to control the power inverter, the controller being configured to control the AC power by performing switching between multi-pulse control and one-pulse control on the basis of electric power loss of the electric motor and the power inverter and noise of the electric motor,
wherein the controller refers to third corresponding information in which third information indicating that noise satisfies a criterion or fourth information indicating that the noise does not satisfy the criterion is associated with a torque command value of the electric motor and a voltage input to the power inverter, and
wherein the controller selects the one-pulse control, and wherein the third information is derived on the basis of the torque command value of the electric motor and the voltage input to the power inverter.

2. The control system according to claim 1, wherein the controller derives the electric power loss on the basis of a rotation speed of the electric motor and a voltage input to the power inverter.

3. The control system according to claim 2,
wherein the controller refers to first corresponding information in which first information indicating that the electric power loss satisfies a criterion or second information indicating that the electric power loss does not satisfy the criterion is associated with the rotation speed of the electric motor and the voltage input to the power inverter, and
wherein the controller selects the one-pulse control when information derived on the basis of the rotation speed of the electric motor and the voltage input to the power inverter is the first information.

4. The control system according to claim 2, wherein the controller further derives the electric power loss on the basis of a torque command value of the electric motor.

5. The control system according to claim 4,
wherein the controller refers to second corresponding information in which first information indicating that the electric power loss satisfies a criterion or second information indicating that the electric power loss does not satisfy the criterion is associated with the rotation speed of the electric motor, the voltage input to the power inverter, and the torque command value of the electric motor, and wherein the controller selects the one-pulse control when information derived on the basis of the rotation speed of the electric motor, the voltage input to the power inverter, and the torque command value of the electric motor is the first information.

6. The control system according to claim 1, wherein the third corresponding information is information generated on the basis of information indicating a change in the noise with respect to a rotation speed of the electric motor for each combination of the torque command value of the electric motor and the voltage input to the power inverter.

7. The control system according to claim 1, wherein the controller acquires an electric current index indicating a magnitude of an electric current output from the power inverter to the electric motor when the multi-pulse control is being executed and switches the control to the one-pulse control when the acquired electric current index is less than or equal to a threshold value.

8. The control system according to claim 7, wherein the threshold value is an index that is set so that a specific electric current in consideration of an electric current increased by the switching is not greater than or equal to a specific threshold value greater than the threshold value when the control has been switched from the multi-pulse control to the one-pulse control.

9. The control system according to claim 7, wherein the controller does not switch the control to the one-pulse control when the electric current index exceeds the threshold value and switches the control to the one-pulse control when a change from a state in which the electric current index exceeds the threshold value to a state in which the electric current index is less than or equal to the threshold value is made.

10. A vehicle system, comprising:
the control system according to claim 1; and
driving wheels configured to be driven by power of the electric motor.

11. A control method, comprising:
controlling, by a control device, AC power to be output to an electric motor to be driven using AC power output by a power inverter by controlling the power inverter configured to convert DC power into the AC power;
controlling, by the control device, the AC power by performing switching between multi-pulse control and one-pulse control on the basis of electric power loss of the electric motor and the power inverter and noise of the electric motor; and
acquiring, by the control device, an electric current index indicating a magnitude of an electric current output from the power inverter to the electric motor when the multi-pulse control is being executed and switches the control to the one-pulse control when the acquired electric current index is less than or equal to a threshold value.

12. The control method of claim 11, wherein the threshold value is an index that is set so that a specific electric current in consideration of an electric current increased by the switching is not greater than or equal to a specific threshold value greater than the threshold value when the control has been switched from the multi-pulse control to the one-pulse control.

13. The control method of claim 11, wherein the control device does not switch the control to the one-pulse control when the electric current index exceeds the threshold value and switches the control to the one-pulse control when a change from a state in which the electric current index exceeds the threshold value to a state in which the electric current index is less than or equal to the threshold value is made.

14. A control system, comprising:
a power inverter configured to convert direct current (DC) power into alternating current (AC) power;
an electric motor configured to be driven using the AC power output by the power inverter; and
a controller configured to control the power inverter, the controller being configured to control the AC power by performing switching between multi-pulse control and one-pulse control on the basis of electric power loss of the electric motor and the power inverter and noise of the electric motor, wherein the controller acquires an electric current index indicating a magnitude of an electric current output from the power inverter to the electric motor when the multi-pulse control is being executed and switches the control to the one-pulse control when the acquired electric current index is less than or equal to a threshold value.

15. The control system according to claim 14, wherein the threshold value is an index that is set so that a specific electric current in consideration of an electric current increased by the switching is not greater than or equal to a specific threshold value greater than the threshold value when the control has been switched from the multi-pulse control to the one-pulse control.

16. The control system according to claim 14, wherein the controller does not switch the control to the one-pulse control when the electric current index exceeds the threshold value and switches the control to the one-pulse control when a change from a state in which the electric current index exceeds the threshold value to a state in which the electric current index is less than or equal to the threshold value is made.

* * * * *